(12) United States Patent
Kalajan

(10) Patent No.: US 7,639,943 B1
(45) Date of Patent: Dec. 29, 2009

(54) COMPUTER-IMPLEMENTED SYSTEM AND METHOD FOR AUTOMATED IMAGE UPLOADING AND SHARING FROM CAMERA-ENABLED MOBILE DEVICES

(76) Inventor: Kevin E. Kalajan, 14077 Gochine Dr., Nevada City, CA (US) 95959

( * ) Notice: Subject to any disclaimer, the term of this patent is extended or adjusted under 35 U.S.C. 154(b) by 418 days.

(21) Appl. No.: 11/281,193

(22) Filed: Nov. 15, 2005

(51) Int. Cl.
*G03B 29/00* (2006.01)

(52) U.S. Cl. ............... 396/429; 709/203; 709/230; 709/219

(58) Field of Classification Search ........... 396/429, 396/247, 264, 374; 348/207.1, 207.11, 211, 348/211.6; 455/83, 84, 90.3, 78; 709/230
See application file for complete search history.

(56) References Cited

U.S. PATENT DOCUMENTS

| | | | |
|---|---|---|---|
| 4,876,597 A | 10/1989 | Roy et al. | |
| 5,553,609 A | 9/1996 | Chen et al. | |
| 5,737,491 A * | 4/1998 | Allen et al. | 704/270 |
| 6,038,295 A * | 3/2000 | Mattes | 379/93.25 |
| 6,122,526 A | 9/2000 | Parulski et al. | |
| 6,256,059 B1 * | 7/2001 | Fichtner | 348/222.1 |
| 6,278,466 B1 * | 8/2001 | Chen | 345/473 |
| 6,751,454 B2 * | 6/2004 | Thornton | 455/412.1 |
| 6,784,925 B1 * | 8/2004 | Tomat et al. | 348/207.11 |
| 6,847,334 B2 | 1/2005 | Hayhurst et al. | |
| 6,995,789 B2 * | 2/2006 | McIntyre et al. | 348/207.1 |
| 7,034,880 B1 * | 4/2006 | Endsley et al. | 348/333.11 |
| 7,170,551 B2 * | 1/2007 | Fichtner | 348/207.1 |
| 7,188,307 B2 * | 3/2007 | Ohsawa | 715/205 |
| 7,239,346 B1 * | 7/2007 | Priddy | 348/220.1 |
| 7,343,049 B2 * | 3/2008 | Butterworth | 382/284 |
| 2002/0108118 A1 | 8/2002 | Cohen et al. | |
| 2004/0012811 A1 * | 1/2004 | Nakayama | 358/1.15 |
| 2004/0061667 A1 * | 4/2004 | Sawano | 345/30 |
| 2004/0174434 A1 * | 9/2004 | Walker et al. | 348/211.3 |
| 2004/0264542 A1 * | 12/2004 | Kienitz | 374/120 |
| 2005/0036034 A1 * | 2/2005 | Rea et al. | 348/207.1 |
| 2006/0105806 A1 * | 5/2006 | Vance et al. | 455/556.1 |
| 2007/0008321 A1 * | 1/2007 | Gallagher et al. | 345/473 |

* cited by examiner

*Primary Examiner*—W. B. Perkey
*Assistant Examiner*—Linda B Smith

(57) ABSTRACT

A computer-implemented system and method for automatically capturing a set of images with a camera-enabled mobile device and for uploading the set of images to a network server is disclosed. The present invention further includes creating an animation of two or more images of the set of images automatically captured by the camera-enabled mobile device.

29 Claims, 23 Drawing Sheets

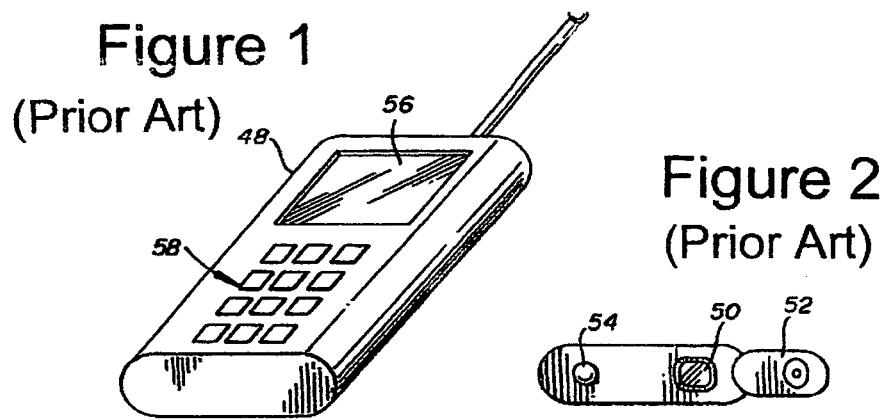

COMPUTER-IMPLEMENTED SYSTEM AND METHOD FOR AUTOMATED IMAGE UPLOADING AND SHARING FROM CAMERA-ENABLED MOBILE DEVICES

BACKGROUND

1. Related Application

This patent application is related to U.S. patent application, Ser. No. 11/321,154; filed on Dec. 28, 2005; and filed by the same applicant as the present patent application.

2. Field

Embodiments of the invention relate to the field of camera-enabled mobile devices and computer network applications and networked communications.

3. Related Art

Camera-enabled mobile devices continue to show an increasing popularity. Typical user paradigms include user-initiated image or video capture with operator-specific post processing options, including for example, save locally, e-mail, send via MMS, upload to a web site, etc. Much of the mobile device industry is focused on delivering content to mobile devices. Clearly, the delivery of content to mobile devices is critical and useful. However, as mobile devices increase in power and functionality, these devices become increasingly important as sources of content in addition to being consumers of content. One important source of content on these devices is the image or video capture components provided with camera-enabled mobile devices.

U.S. Patent Application Publication No., 2002/0108118A1 describes a digital data storage and transmitting device particularly suited for use with a digital camera, digital camcorder, or other image/video capturing device. The digital data storage and transmitting device is configured in to upload or transmit picture information to a remote server using any of a number of communication protocols or techniques, including wireless or cell phone technologies. However, the device described in the referenced patent application is a wireless digital camera adapter and not a camera-enabled mobile telephone.

U.S. Pat. No. 6,847,334 describes a mobile telecommunication device for simultaneously transmitting and receiving sound and image data. The described mobile telecommunication unit provides two-way remote viewing of images and real-time audio. The self-contained portable unit communicates directly with a similar unit at a remote location across POTS lines, cellular, ISDN, T-1, and satellite communications links. In one implementation of the system described in the referenced patent, a portable, mobile telecommunication unit is designed to transmit voice, and still image data simultaneously to a compatible device on the other end of a telephone connection. One unit is placed into contact with the second, compatible device by a phone call. To capture an image the user takes a picture with a digital camera provided with the unit. Through a camera interface, the digital camera transfers an image to the local unit. The local unit can then transmit the image to the remote unit. The device described in the '334 patent does not automatically capture images with a camera-enabled mobile device and does not upload images to a network server. Further, the referenced patent does not describe a way to archive and automatically animate (convert images to movies) the automatically uploaded images. Additionally, the referenced patent does not describe the automatic archiving and sharing of the transmitted image data.

U.S. Pat. No. 5,553,609 describes an intelligent remote visual monitoring system for home health care service. In this system, a computer-based remote visual monitoring system is provided for in home patient health care from a remote location via ordinary telephone lines. A number of master monitoring computers are linked to a control center and are accessible by a corresponding number of health care professionals. A slave monitoring computer is located within the home of a plurality of patients and may be linked via telephone modems to any of the master monitoring computers. Audio/visual equipment at both locations, permits real-time two-way communications during an in-home visit to a patient by a healthcare professional from a remote location. However, the '609 patent does not describe a system in that uses camera-enabled mobile devices to upload images to a networked server. Further, the referenced patent does not describe a way to archive and automatically animate (convert images to movies) the automatically uploaded images.

U.S. Pat. No. 4,876,597 describes a system wherein a scene to be monitored (e.g., at a remote location or at a later time) is captured as a series of still images. These images are digitally encoded and stored in a digital memory for subsequent retrieval and viewing. If the scene includes a moving object (e.g., the side of a moving freight train), the images may be taken so that they are substantially mutually exclusive and collectively exhaustive of the moving object. During playback, two or more adjacent images may be displayed adjacent to one another so that any feature partly present in adjacent images is visible as a whole. If the observer is at a location remote from the point at which the images are taken, various techniques can be used to facilitate transmission of the image information (preferably in digital form) via relatively low-cost transmission links such as voice-grade telephone lines. The '597 patent is further described as an invention that will be fully understood from an explanation of its use in identifying moving railroad freight cars, especially (although not necessarily) at locations remote from the observer required to make the identification. Thus, the '597 patent does not describe the use of a mobile device for capturing images. Further, the referenced patent does not describe a way to archive and automatically animate (convert images to movies) the automatically uploaded images.

U.S. Pat. No. 6,122,526 describes a combined telephone/camera unit that includes a camera module for generating electronic image data representative of a scene to be imaged, a memory unit for storing the electronic image data generated by the camera module, a display screen for displaying the electronic image data stored in the memory unit, a mechanism for selecting which of the plurality of base units is to receive the digital image data, and a cellular transceiver for transmitting the digital image data to the base units selected by the selection mechanism. However, the '526 patent does not describe a system in that uses camera-enabled mobile devices to automatically upload images to a networked server on a periodic basis. Further, the referenced patent does not describe a way to archive and automatically animate (convert images to movies) the automatically uploaded images.

Thus, a computer-implemented system and method for automatically capturing images with a camera-enabled mobile device and for uploading the images to a network server is needed.

BRIEF DESCRIPTION OF THE DRAWINGS

The present invention is illustrated by way of example and not limitation in the figures of the accompanying drawings, in which FIGS. 1-3 illustrate a prior art camera-enabled cellular telephone.

DETAILED DESCRIPTION

A computer-implemented system and method for automatically capturing images with a camera-enabled mobile device and for uploading the images to a network server is disclosed. In the following description, numerous specific details are set forth. However, it is understood that embodiments of the invention may be practiced without these specific details. In other instances, well-known processes, structures and techniques have not been shown in detail in order not to obscure the understanding of this description.

Figure 3:
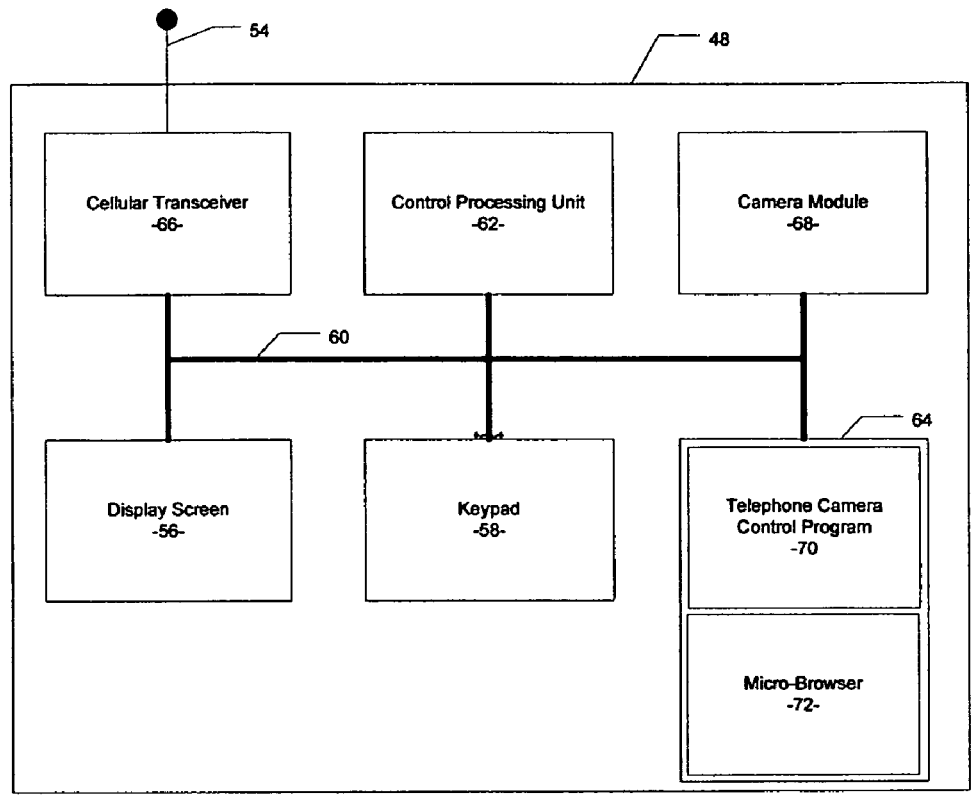

Referring to FIGS. 1-3, a prior art camera-enabled cellular telephone 48 is illustrated. The top end of the combined unit 48 typically includes a lens 50 and an antenna 54. Although not used much in camera phones today, one embodiment may also have a flip up flash unit 52. The front face of unit 48 is typically provided with a liquid crystal or plasma display screen 56 and a telephone keypad 58, both of which are electrically coupled to an internal bus 60 (as shown in FIG. 3). Referring to FIG. 3, camera-enabled telephone 48 includes a cellular transceiver component 66, a control processing unit 62, a camera module 68, a display screen 56, a keypad 58, and memory unit 64. Each of these components is interconnected via bus 60. Memory unit 64 can be used to store an application software component or telephone/camera control program 70 used to control the basic conventional features of camera-enabled telephone 48. In operation, a user can activate a shutter button (not shown) to capture an image through camera module 68 and send the image to a remote receiver via cellular transceiver 66. Prior art cellular telephones can also be used to establish a wireless Internet connection using a micro browser 72 stored in memory unit 64. In this manner, a user of prior art camera-enabled cellular telephone 48 can also manually capture images and transfer the images wirelessly to a remote user or to a webpage via the Internet.

Hand held or battery-operated products such as cellular/mobile phones, two-way pagers, personal digital assistants (PDA's), and personal organizers can communicate with other devices or servers by way of a wireless link. In one implementation, the Java programming environment developed by Sun Microsystems™ Inc. enables software developers to write device-independent wireless applications for accessing, downloading, or updating information over the wireless link. Sun™ provides a Java™ 2 Platform, Micro Edition (J2ME) that can be used with a Mobile Media API (MMAPI). The MMAPI extends the functionality of the J2ME platform by providing audio, video and other time-based multimedia support to resource-constrained mobile devices. MMAPI allows Java developers to gain access to native multimedia services available on a given device. Nevertheless, it will be apparent to those of ordinary skill in the art that embodiments of the present invention can be developed without using a Java™ platform. Other programming paradigms (other than Java) include: Microsoft Windows Mobile, Symbian, Qualconmm's BREW, and Palm's PalmOS.

The present invention leverages these prior art technologies and extends the functional capabilities to provide a computer-implemented system and method for automatically capturing images with a camera-enabled mobile device and for uploading the images to a network server.

Figure 4:
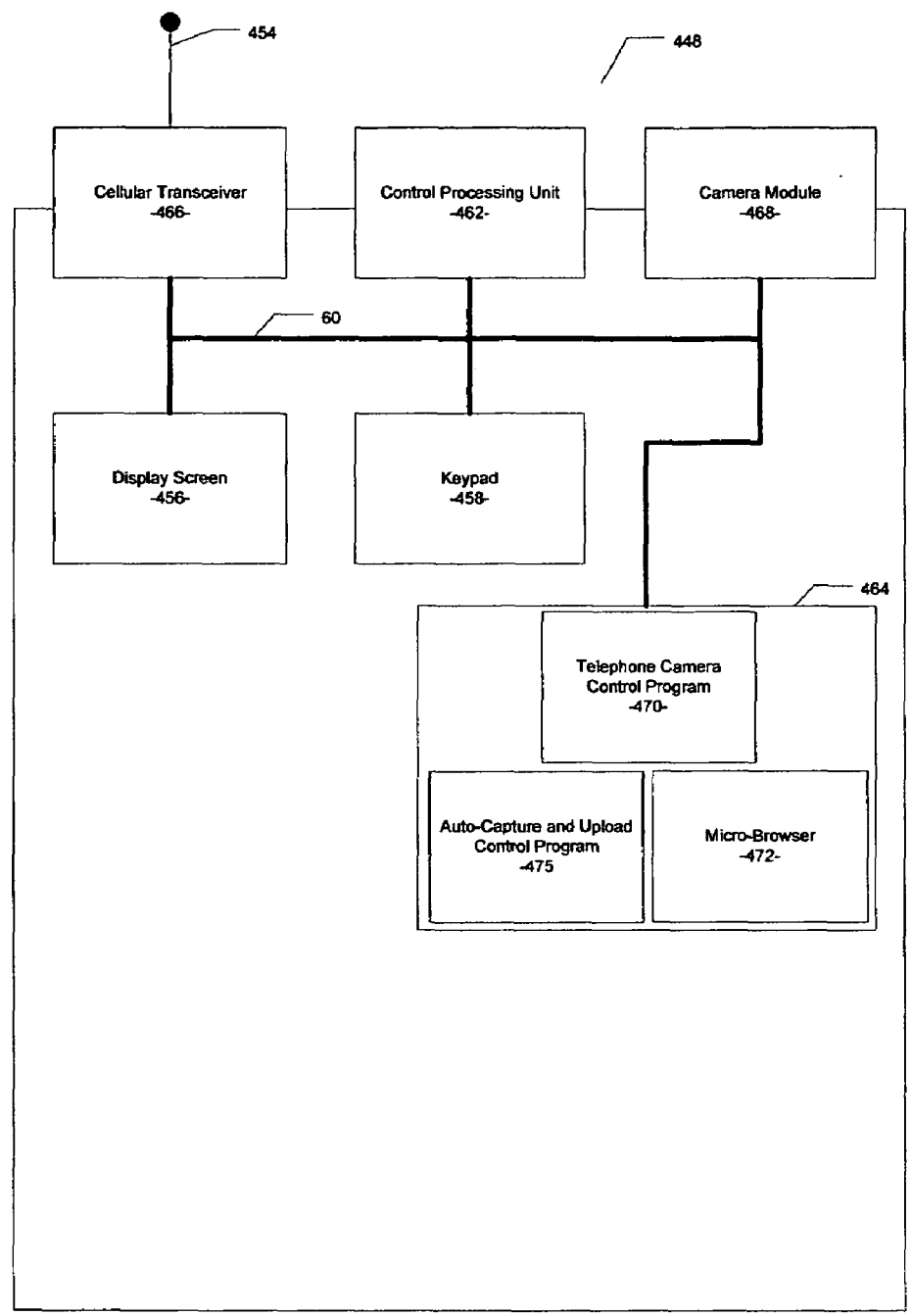
FIG. 4 illustrates a camera-enabled mobile device supporting the functionality of the present invention.

Referring to FIG. 4, a camera-enabled mobile device 410 supporting the functionality of the present invention is illustrated. As in a conventional camera-enabled mobile device, mobile device 410 includes a cellular transceiver 466, control processing unit 462, a camera module 468, a display screen 456, a keypad 458, and memory unit 464. Mobile device 410 includes a telephone camera control program 470 stored in memory unit 464. Control program 470 controls the basic conventional functions of device 410. Device 410 can also include micro browser 472 to enable a user of mobile device 410 to access the Internet via a wireless connection.

In one embodiment, mobile device 410 also includes an auto capture and upload control program 475. Control program 475 includes executable software and related data for implementing and controlling various features of the present invention, as will be described in more detail below. Control program 475 can be fetched and executed by control processing unit 462 via bus 460.

Figure 5:
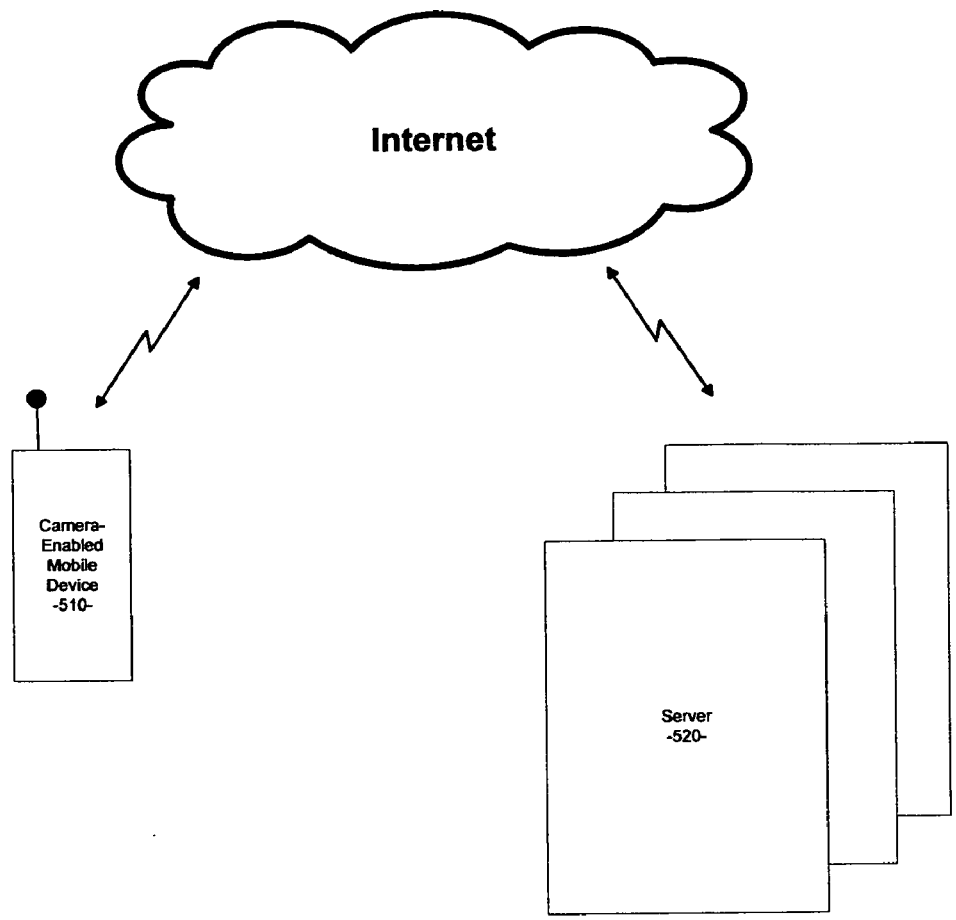
FIG. 5 illustrates a system architecture for uploading images to one or more servers via the Internet.

The present invention provides a network-based system and service using software that executes partly on camera-enabled mobile devices and partly on a server. Using the present invention, a collection of images captured by the camera-enabled mobile device of an originating user (denoted herein as the subscriber) can be uploaded to a server and processed by the server for subsequent access and viewing by other authorized users (denoted herein as guests). Referring to FIG. 5, a camera-enabled mobile device 510 embodying the functionality of the present invention can automatically capture one or more images using the camera of mobile device 510. The captured images can then be wirelessly transferred via the Internet to one or more load-balanced servers 520. Conventional interfaces and protocols exist for wirelessly transferring images to a server via the Internet. However, no conventional technologies provide a means for automatically capturing images with a camera-enabled mobile device and for uploading the images to a network server in the manner described and claimed herein. As will be described in more detail below, server 520 can process the set of uploaded images for viewing by other authorized users.

Figure 6:
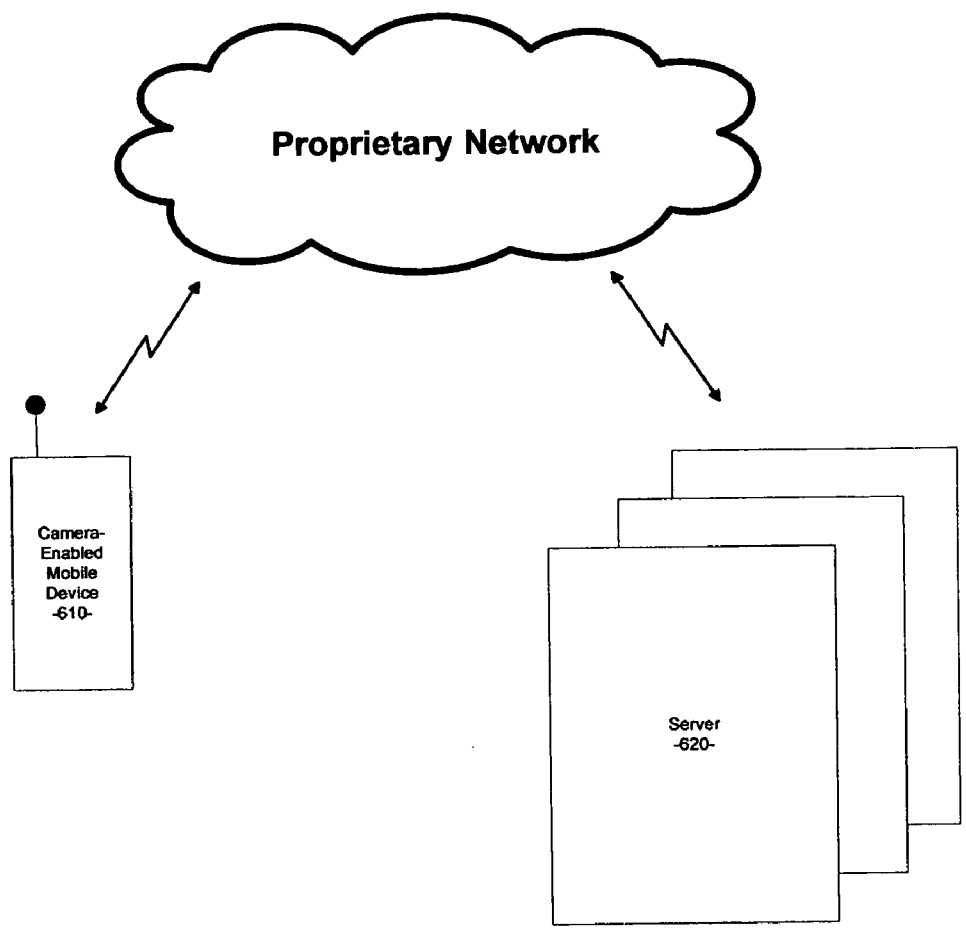
FIG. 6 illustrates a system architecture for uploading images to one or more servers via a proprietary network.

Referring to FIG. 6, it will be apparent to those of ordinary skill in the art that computer networks other than the Internet can be used for the transfer of images between camera-enabled mobile device 610 and server 620. Proprietary networks, peer-to-peer networks, or other networks can be used for the transfer of images between camera-enabled mobile device 610 and server 620.

Figure 7:
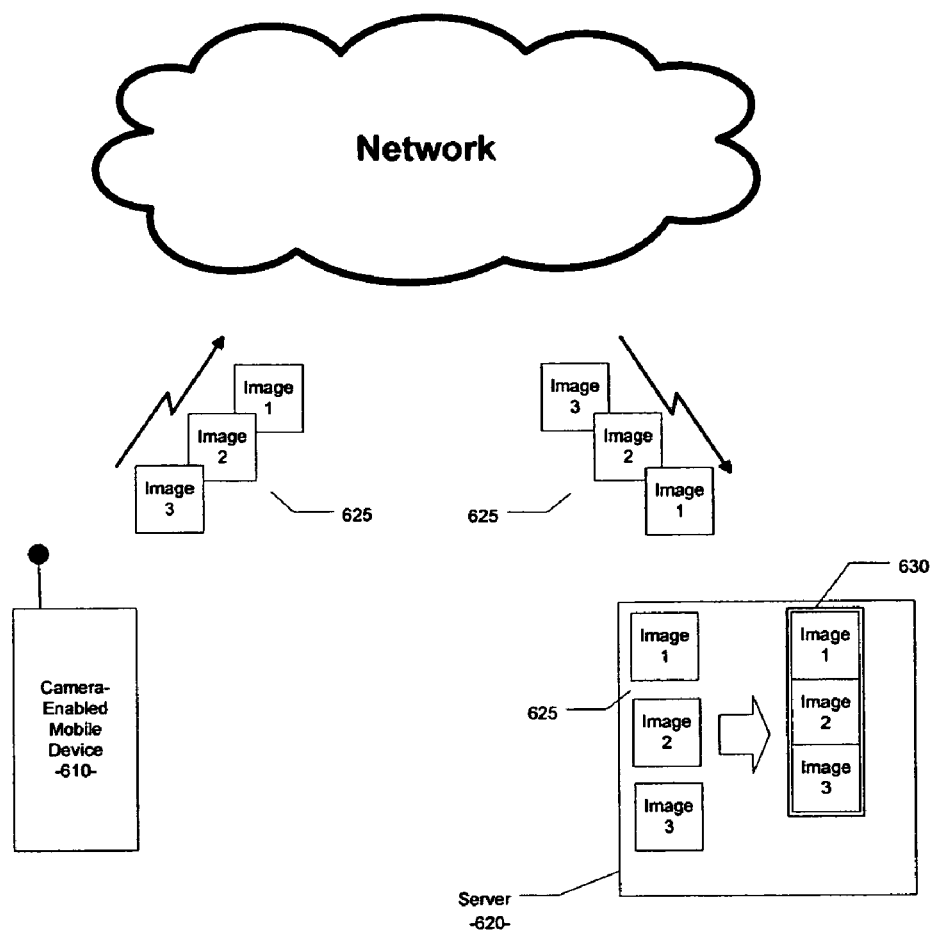
FIG. 7 illustrates the image upload operation of one embodiment.

Referring to FIG. 7, the image upload operation of one embodiment is illustrated. Using auto capture and upload control program 475 (shown in FIG. 4), a series of automatic snapshot images are captured by control program 475 through camera module 468. Note that no manual user activation of a shutter button on mobile device 610 is required. In one embodiment, the auto capture and upload control program 475 of the present invention automatically captures images in the following manner. The subscriber typically places the camera-enabled mobile device in a tripod or other stable configuration (though not a requirement) and activates the auto capture and upload control program 475 in a conventional manner. The auto capture and upload control program 475 may begin by presenting a menu of options to the user (e.g. Configuration settings or help screens) or may, optionally, immediately begin snapping images (at a specified rate) and uploading the images to the network servers 620. The capture of an image is done under program control, typically by registering a request to the mobile device that the auto capture and upload control program 475 wants control of the camera. After this request is successfully satisfied, the auto capture and upload control program 475 of the present invention makes requests to the device's operating system 470 for an image of a specific size, quality, and/or format According to a preconfigured time frequency parameter, mobile device 610 automatically captures snapshot images on a periodic basis. This series of images is depicted in FIG. 7 as images 625. Images 625 represent snapshots automatically taken by mobile device 610 at regular intervals. Again, other than an initial set up and configuration, no action is required by the user of mobile device 610 to capture images 625. Images 625 can be encoded in any of a variety of conventional image formats, including JPEG, TIFF, bitmap. PDF, etc. Once encoded, the images can be transferred to server 620 via a network. Server 620 receives the uploaded images 625 and stores the images in persistent server memory after performing all of the upload server processing steps described below.

In one embodiment, the conventional HTTP POST protocol is used to upload images from the mobile device to Internet-connected servers. This is one of a many ways that image content could be delivered to servers. Other alternative embodiments include (but are not limited to): SMTP (email), FTP (file transfer protocol), HTTP PUT method, or TCP/IP "sockets" combined with a custom/proprietary application-level protocol.

The HTTP POST approach has many benefits compared to other alternatives and was chosen for the preferred embodiment. FTP requires two connections for a transfer and thus is not efficient. FTP also requires FTP usernames and passwords to be managed and has no built-in way to embed meta data with the image (HTTP POST has this via HTTP HEADERS). SMTP is a store-and-forward protocol and thus images could arrive completely out of sequence or be very delayed. HTTP PUT is not well implemented and has security issues. Using low-level TCP/IP sockets suffers from difficulty of implementation on the mobile device, as many mobile operator networks are not designed or optimized for such traffic, which is the reverse case for HTTP POST.

A particularly novel element of the present invention is the automated, rapid uploading of images versus the prior art of "streaming." Streaming refers to the isochronous (fixed rate) transmission of content in real-time. The approach used with images, in the present invention, affords a number of interesting and valuable benefits. First, mobile operator networks are not isochronous, and the bandwidth available to the device varies widely. Uploading images does not require isochronous bandwidth and thus can be used in, literally, any mobile operator network environment. Secondly, uploading images without streaming uses much less bandwidth and hence has minimal impact on operator networks. Thirdly, using the present invention, bi-directional communication can be implemented (e.g. VoiceOvers) because information can be tacked on the reply to each image. Streaming is mono-directional and must be stopped if information arrives "downstream" (versus "upstream"). Fourth, archiving images can be done more efficiently with the present invention than streamed video content, as discrete units of information are available, versus N minutes of streamed video content. Fifth, with the present invention, images can be easily extracted and emailed/distributed; because, the source content is an image, whereas extracting images from a video stream is a much more complicated process. Sixth, with the present invention, adding a layer to an image (e.g. a time stamp, or motion indicator) is an easy and efficient task, whereas adding a layer, in real-time, to a video stream is difficult and time-consuming. Seventh, for users that want to view the content on mobile devices, rate-matching and buffering for video is either very complicated or intractable (i.e it forces the lowest common denominator across all devices). With images in the present invention, the content can be delivered to each user and varying rates without any additional overhead or loss of resolution.

In the event the subscriber wants to stop the automated capture and upload process, the subscriber can click on a "stop" button. However, termination of any existing upload must occur gracefully, meaning that no partial images are saved on the server as this would be undesirable behavior. Hence, upon each stop request, the software must wait until the current upload has completed. Then the software can terminate the existing cycle. The waiting period for the upload to terminate must be bounded by a maximum time limit to handle network errors.

In one embodiment, the process of uploading images upon command by the user can include several detailed steps. The following is a description of some of the low level steps performed in one embodiment to capture and upload an image.

1. Retrieve the preference for image quality
2. Retrieve the preference for image size
3. Retrieve the preference for upload frequency/snap delays
4. Retrieve the URL upload location and related password
5. Retrieve the preference for camera number
6. Retrieve the VoiceOver repeat count
7. Retrieve "advanced image options" (see below)
8. Display current "view of camera" for user
9. Snap the current picture (with possible delay on the first snap to allow camera settle time), with the appropriate image quality/size settings. This starts the "Snap Loop" (referenced below).
10. Construct the POST buffer:
    a. User-Agent must be set to an uppercase unique name to identify this type of client and creator. The format of the unique name is "PLATFORM-VENDOR", e.g. "BREW-ACME" or "JAVA-JOHNDOE". If the User-Agent cannot be set via the device/software platform, then the following HTTP header should be included:
1. "X-WHDC-USERAGENT: <identifier>"
   b. Content-Length can be ignored; it is recommended to not include Content-Length because any mismatch in the value specified with the data sent will cause the server (e.g. Apache) to hang and ultimately timeout.
   c. Add the password header
   d. Add the rate header:
   e. If this device cannot play an audio file from a URL (and it can play audio binary data from a buffer), then a header should be added to indicate the ability to play from a buffer.
   f. Set the request URL to include an ID, a camera number, and an audio type.
   g. As the body of the POST, the binary data of the JPEG image should sent.
11. Get the current time in seconds or milliseconds. Save for use below.
12. Connect to the upload URL server/location and issue the POST. Update the display to indicate the user that a POST is occurring, and, ideally, what percent of the POST has completed. Provide an option for the user to CANCEL the POST. This should return the user to the main menu.
    a. Check the POST reply and determine if audio file is referenced and play with relevant VoiceOver count if appropriate. If the body of the POST reply is "OK" then terminate connection and continue (below). If the body of the POST reply starts with 'A' then perform the following: retrieve the next 100 bytes which is a null-terminated URL containing a URL of a wav audio file. If the VoiceOver repeat count is >0, then play the audio file, setting volume to the maximum. Format is 8-bit, mono, 8 Khz, PCM U8. Set title of canvas/form to be "Retrieving VoiceOver". If VoiceOver repeat count is >1, repeat the audio play for the appropriate number of times.
13. Any response other than 'A' or 'OK' indicates an error occurred during upload. In this case, display an error for 3 seconds with a sound (if possible) and then continue (below).
14. Mark the end-time and subtract the previously mentioned start time timestamp. Calculate the bits per seconds for the upload and store in non-volatile memory to display on the Preferences screen.
15. Delay for the required time, subtracting from the delay time the time it took to play the audio (including all repeated instances). If there was audio. It is very possible that no delay will be necessary.
16. Continue the "Snap Loop" until the user hits the "Stop" button.
17. Calculate the start and end time of the upload and calculate the bits/second rate. Store this for use in upload as described above.

In one embodiment, an animation preprocessing operation is performed by server 620. As shown in FIG. 7, this animation process uses a set of individual images 625 and combines the individual images together to form an animation clip or video object 630 comprising a timed sequence of the images 625. The combination of individual images 625 into animation clip (or video object) 630 can be done in a variety of ways. In one embodiment, images 625 are reformatted and combined together in a sequence corresponding to a timestamp associated with each individual image. The timestamp can represent the time when the individual image was captured or when the image was received by server 620. One embodiment of the animation process is described below. Note that the process of simply converting JPEG images to a video is known in the prior art. However, the application of this process to a system wherein images are automatically captured and uploaded from camera-enabled mobile devices is novel and non-obvious.

On one embodiment, animation has two parts: automatic, and user-selected. "Automatic" means that the last N minutes of incoming images are automatically converted into a displayable video object (which in turn is automatically refreshed at a pre-defined rate, to keep the displayable video object current). The user configures how many prior N minutes of recent activity is desired, and with what video quality level and what pixel size (e.g. 320×240) the displayable video object is created. Note that in one embodiment, only motion-detected images or images that are pre-buffered and post-buffered motion-detected are included in this recent activity.

User-selected animations come from the user-selected activity timeline (as described in more detail below and illustrated in FIGS. 22 and 23) with a start time, duration, and quality. In one embodiment, the following animation processing steps are performed by server 620:

1. First, copy the relevant image files to temporary storage for the purposes of preparing for animation. Typically the image files are renamed to frame1, frame2, . . . frameN, etc.
2. Optionally, move any ancillary images from an advertisement, notice, or the like, if relevant, to the temporary storage. These ancillary images may have to be replicated to slow down the ancillary images if the ultimate video clip is very short. The ancillary images also must be resized to match the desired (typically user-selected) output size.
3. Renumber the pre-pended ancillary images and source (i.e. captured) images to be frame1 . . . frame N.
4. Optionally, resize all the images to the desired video object size.
5. Optionally, replicate images to simulate slow-motion or rate reduction.
6. Create a video object using a specific codec (e.g. Quicktime, Windows Media, MPEG, Motion JPEG, Macromedia Flash). Multiple codec's may be used to create multiple output types of the video object, simultaneously.
7. Make the resulting video object available to the relevant, authorized set of users (i.e. guests) and perform any other post-processing, book-keeping functions (e.g. digital rights management, expiration date maintenance, etc.).

In one embodiment, ancillary images, such as advertisements, notices, licenses, waivers, and the like, can be inserted into an animation. Ad insertion is used to enable the option of providing a "free" account and to generate revenue from accounts that otherwise would not generate revenue. The following describes an ancillary image insertion process in one embodiment.

Ads can appear at the beginning of video objects constructed as animations of uploaded images. Ad content is provided by an advertiser and would normally come in a video format (e.g. Quicktime). This format must be converted to images for use with the present invention. In one embodiment, the processing performed for ad content is described below.

1. In a set of one time processing steps: convert the ad content to a series of images. Various conventional tools are available for accomplishing this.
2. Use a subset of the ad images (e.g. every $5^{th}$, $10^{th}$, etc.) to avoid creating a resulting video file that is overly large.
3. Save the ad images in persistent storage with a given size (e.g. 320×240)
4. Wait for a request to generate an ad for a clip.
5. In a set of processing steps performed upon the upload of an image: Determine the required size for the ad image based on the size of the uploaded image. That is, if the user is uploading images at 176×144, the ad image must be 176×144 or the animation process will fail (images, uploaded and ad, must all be the same size).
6. See if the ad image has previously been converted to this size. If so, use these size-converted ad images. Otherwise, convert the ad images to the required size and save for future requests of the same size.
7. Determine the length of the video clip. If the video is very short, rate adjustment for the ad may be required to make the length of the ad commensurate with the length of the video clip.
8. Add the ad images to the collection of uploaded images used to create the video object.
9. Animate the entire series of uploaded images and ad images. A similar process can be used for any type of ancillary images that can be inserted into an animation.

In this manner, animation or video object 630 can be created by server 620 from a collection of two or more individual images as selected by a user. Further details on the user image selection process are provided below.

Figure 8:
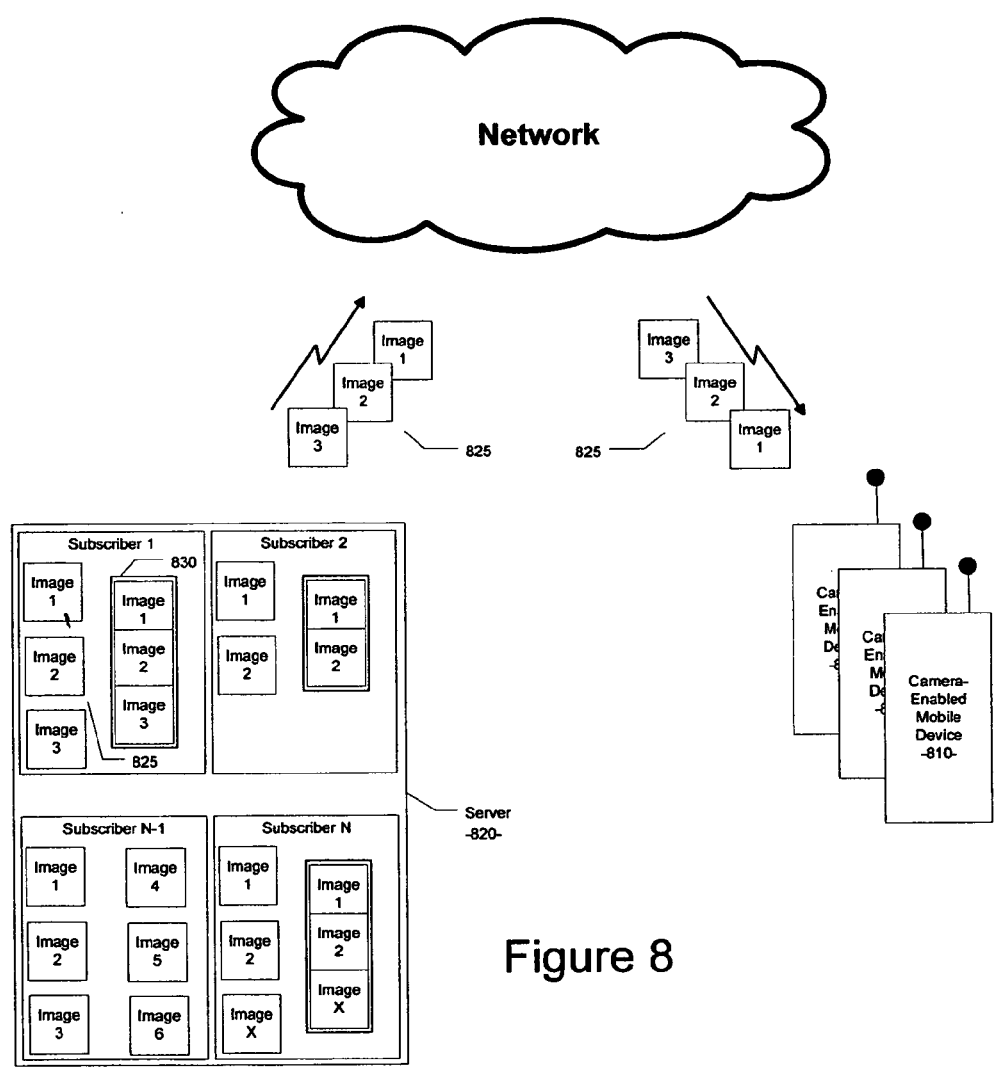
FIG. 8 illustrates one embodiment of the image download process of the present invention.

Referring to FIG. 8, the image download process of the present invention is illustrated. Using the image capture and upload process described above, server 820 retains a set of captured images in server 820 memory for each of a set of subscriber users. As used herein, the term subscriber corresponds to a user who has activated a camera-ready mobile device for the automatic capture and upload of images. In other words, the subscriber is a user who is creating and uploading images to server 820. Using techniques described above, a subscriber user or subscriber creates an account on server 820. As part of the created account, the subscriber receives access to a portion of server 820 memory for the storage of uploaded images. Thus, as shown by example in FIG. 8, server 820 retains a collection of captured and uploaded images for each of a plurality of subscribers in memory storage areas allocated for each subscriber. As will be described in more detail below, the subscriber can make his or her collection of images and/or animations resident in server 820, accessible and viewable by other authorized users (denoted herein as guest users or guests) via a network connection. As shown in FIG. 8, an authorized user of a mobile device 810 (i.e. a guest) or an authorized user of any viewing device (see FIG. 10) can select one or more images 825 and/or animations 830 for download from a particular subscriber's image collection. The selected images 825 and/or animations 830 are transferred to the requesting guest's authorized mobile device 810 or other viewing device 1030 via the network.

Figure 9:
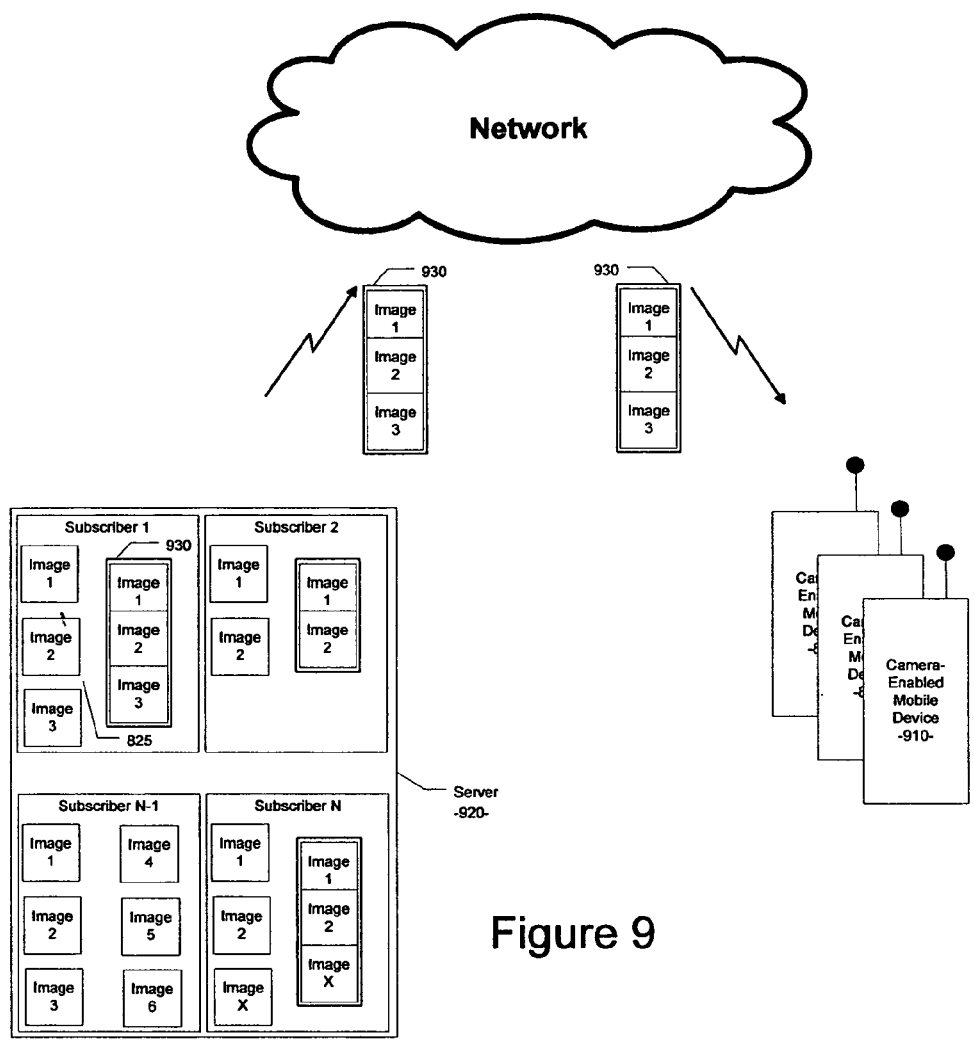
FIG. 9 illustrates one embodiment of the image download process of the present invention for use with animations.

Referring to FIG. 9, a similar process is used to download video or animation objects 930 from a selected subscriber image collection (i.e. library) to an authorized guest 910 via the network. As will be described in more detail below, an authorized guest (or subscriber) can configure and activate the creation of a unique video or animation object from two or more images in a given subscriber's image collection. Using the activity timeline user interface described in more detail below, the authorized guest specifies a point on the activity timeline. Images in a given subscriber's collection corresponding to the specified point in time are assembled by server at 920 into a video or animation object and delivered to the requesting authorized guest via the network. In this manner, authorized guests have convenient access to one or more images or on-the-fly created video or animation objects of a specified subscriber.

Figure 10:
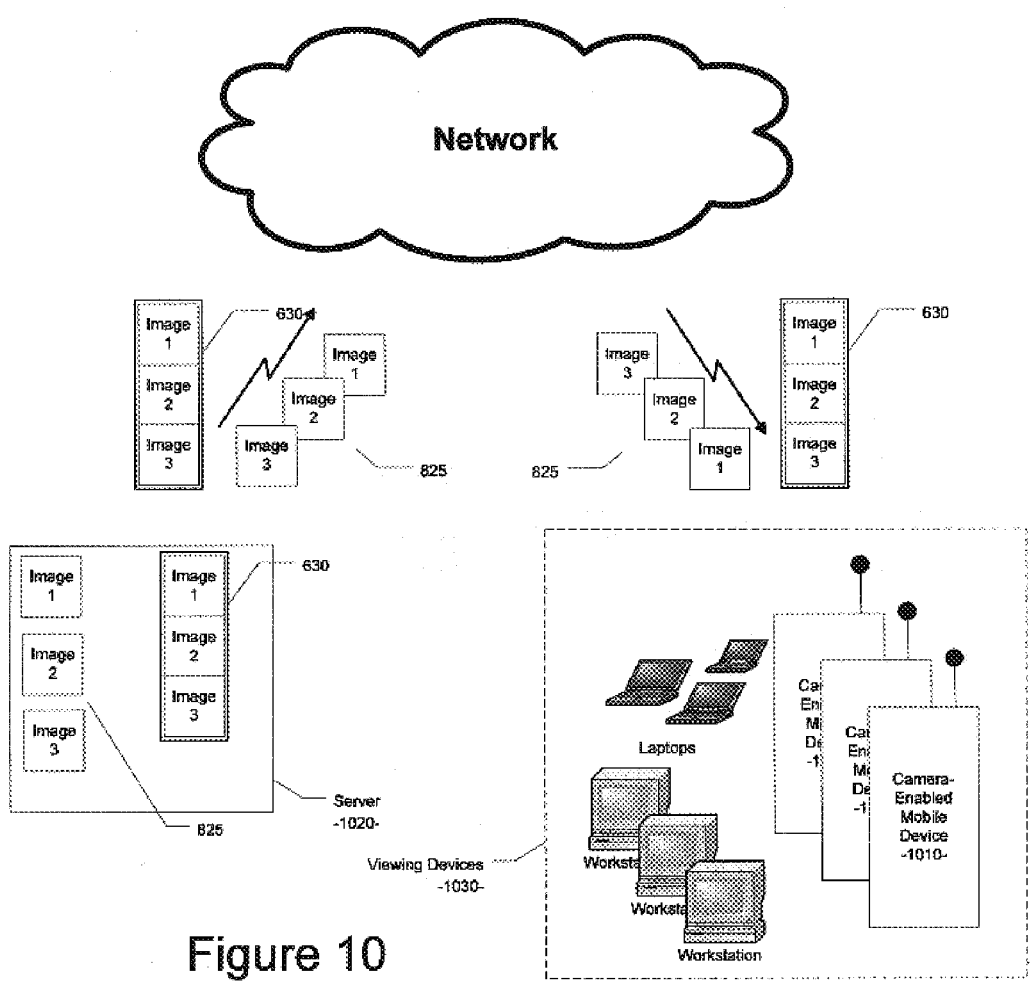
FIG. 10 illustrates one embodiment of the image download process of the present invention for use with various client devices.

Referring to FIG. 10, subscriber images and corresponding animations are retained by server 1020 as described above. These images and animations can be delivered to authorized guests via the network. As shown in FIG. 10, authorized guests can be using a variety of viewing devices 1030. These viewing devices 1030 can include camera-enabled mobile devices 1010, laptop computers, workstation computers, personal digital assistants, or other network connectable viewing devices.

Figure 11:
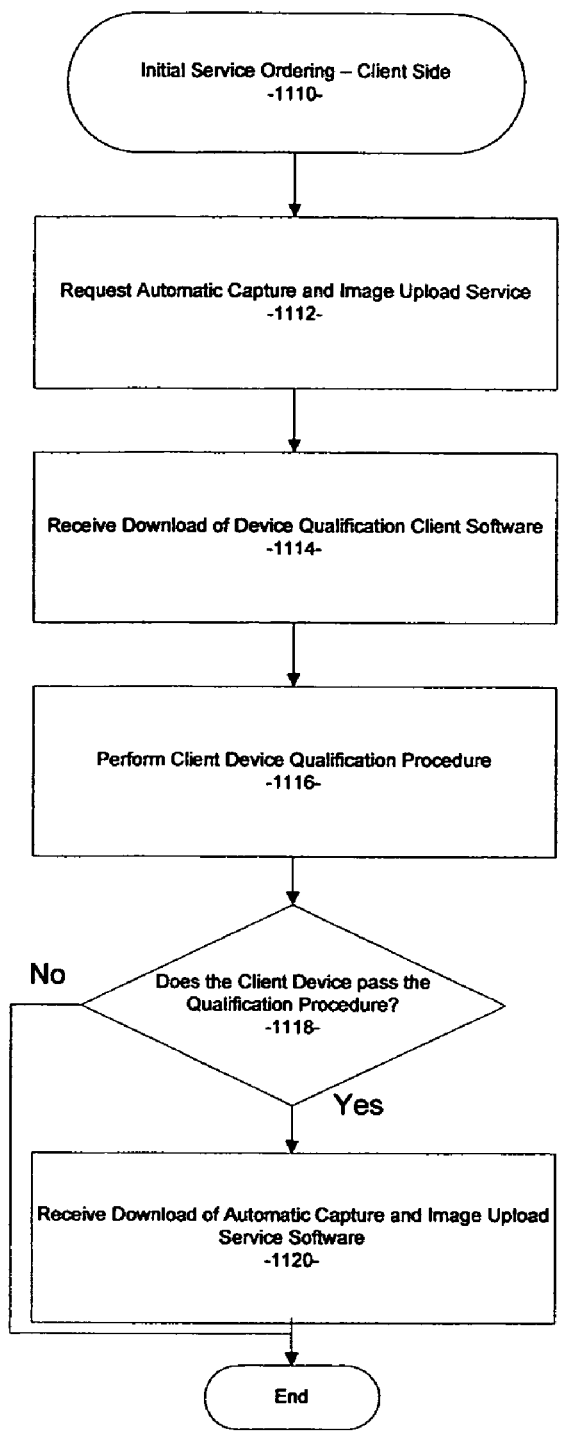
FIG. 11 is a flow diagram illustrating processing for initial service ordering.
Figure 12:
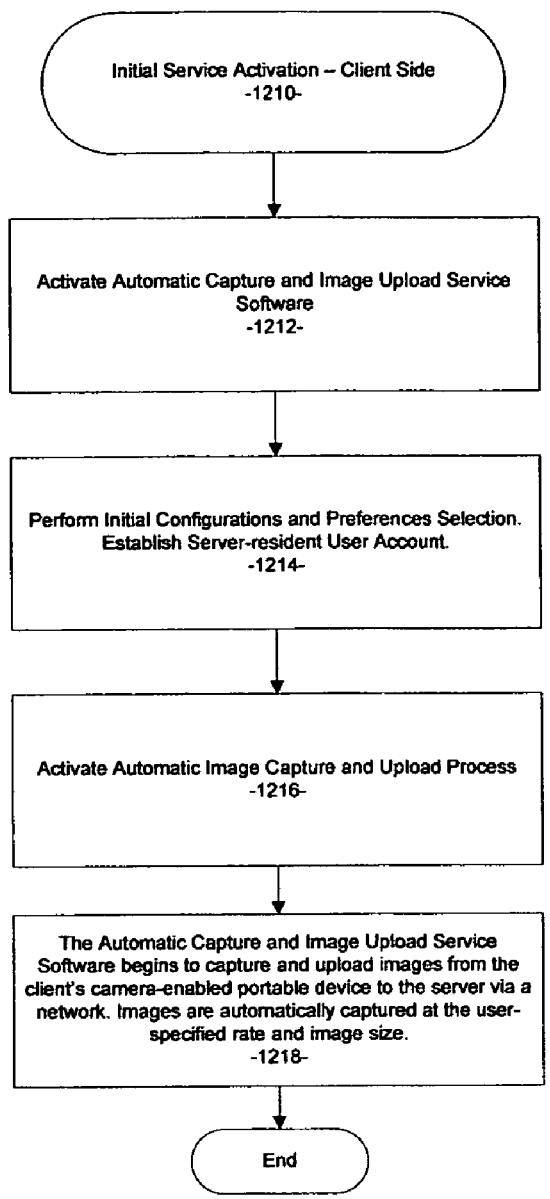
FIG. 12 is a flow diagram illustrating processing for initial service activation, client side.

Referring to FIGS. 11-21, processing flow diagrams illustrate some of the basic processes performed by or with the present invention. Referring to FIG. 11, the initial service ordering steps from the client side perspective are illustrated. In processing block 1112, a client device user can request the automatic capture and image upload service provided by the present invention. Using a conventional web site or an e-mail link, the upload service of the present invention can be made available to a client user. Upon user activation of a link or soft button, the user receives a download of device qualification client software in block 1114. The device qualification client software is used to determine if the client device can support the automatic capture and image upload functions. This client device qualification procedure is executed on the client device in processing block 1116. If the client device cannot support the automatic capture and image upload functions, execution terminates at the End bubble. If the client device will support the automatic capture and image upload functions, the automatic capture and image upload service software is downloaded to and received by the client device in processing block 1120. Referring to FIG. 12, the initial service activation steps from the client perspective are illustrated (block 1210). Once the automatic capture and image upload service software has been downloaded to the client device (block 1120), this software is activated by the client user in block 1212. In block 1214, the user can use the automatic capture and image upload service software to perform initial configurations and preference selection. With the appropriate authorization, the user can edit preferences on the server or preferences on the client device. In one embodiment, these server preferences include one or more of the following: device/camera title, time zone, date/time stamp (with location and font), thumbnail dimensions, matrix view columns and image sizes, motion detection options, recent activity window timeframe (number of recent minutes to show), quality setting for recent activity window, size of recent activity window, default size/quality for activity timeline animations, location of date/time stamp, font of date/time stamp, crop region, live window dimensions, rotation parameters, monochrome conversion parameters, contrast adjustment, voiceover compression level, enable/disable Web access for live images, access control via HTTP_REFERER or QUERY_STRING, and language selection. In one embodiment, these client device preferences include one or more of the following: Language preference (e.g. French, English, etc) (preferably auto detected, but could be an explicit preference), Delay between snapshots, Image quality (low/medium/high, 1-100), Image size (e.g 320×240), VoiceOver count (number of times to repeat received message, 0=disable/mute capability), Autostart or not (immediately begin automatic image capture upon start of program, or alternatively go to main menu for configuration etc), Virtual Camera number (if the user has multiple accounts), flash on/off, zoom level, shutter sound, start/stop time of capture, maximum # of images, maximum total of bytes uploaded, allow interruption from phone call, etc.

Some additional preference processing steps of one embodiment are set forth below.

1. Provide numeric-only input option for "Snap Delay" (in seconds).
2. Provide numeric-only input option for VoiceOver count. Can be free-format or drop-down. Range value is 0-5.
3. Provide drop-down numeric input option for "Camera Number". Range is 1-10.1 is the default.
4. Provide drop-down option for image size. If the list can be enumerated from the device, then fully populate. Otherwise, provide 160×120, 176×144, 240×180, 320×240, and 640×480. If error occurs on snap with the specified size, use fallback algorithm to guarantee some image is snapped.
5. Provide drop-down option for image quality. If the list can be enumerated from the device, then fully populate. Otherwise, provide Low, Medium, High, and Maximum. If error occurs on snap with the specified quality, use fallback algorithm to guarantee some image is snapped.
6. If the device provides additional options (such as flash, shutter sound, etc.) then provide options for these. These are called "advanced image options."
7. Add option for "Auto Start". If set, instead of displaying the menu upon invocation, the software should just begin automatic uploading.
8. Display the bits per second for the most recent transfer.
9. Allow option to save preferences or cancel (and don't save).

It will be apparent to one of ordinary skill that other parameters for particular embodiments of the present invention can be defined and configurable. Referring still to processing block 1214, the client user can establish a user account, which is maintained by the image server. As part of establishing a user account, the server allocates a portion of persistent server memory for the storage of images and or animations captured by the client user and uploaded to the server. In processing block 1216, the client user can activate the automatic image capture and upload process of the present invention. Activation of this function by the client user initiates the automatic capture of images at a user defined frequency using the camera of the client mobile device. In block 1218, the automatic capture and image upload service software on the client device begins to capture and upload images from the client's camera-enabled portable device to the server via the network. Using the previously set preferences and configuration parameters, the images are automatically captured at the user specified rate, with the user specified image size, and in the user specified format for upload to and storage by the server.

Figure 13:
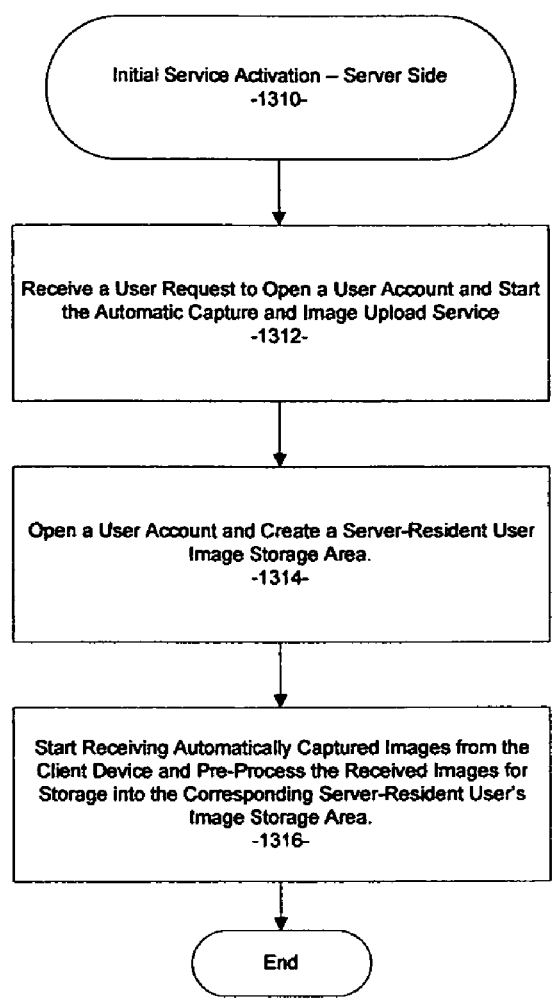
FIG. 13 is a flow diagram illustrating processing for initial service activation, server side.

Referring to FIG. 13, the initial service activation from the server side perspective is illustrated. In block 1312, the server receives a user request to open a user account and start the automatic capture and image upload service. As part of the user account creation, the server allocates a portion of persistent server memory for the storage of images and animations captured by the particular user (block 1314). The server also retains information related to the user. In block 1316, the server starts receiving automatically captured images from the client device and begins the preprocessing of the received images for storage into the corresponding server resident user's image storage area. The preprocessing of the received images performed by the server is described in more detail in FIG. 14.

Figure 14:
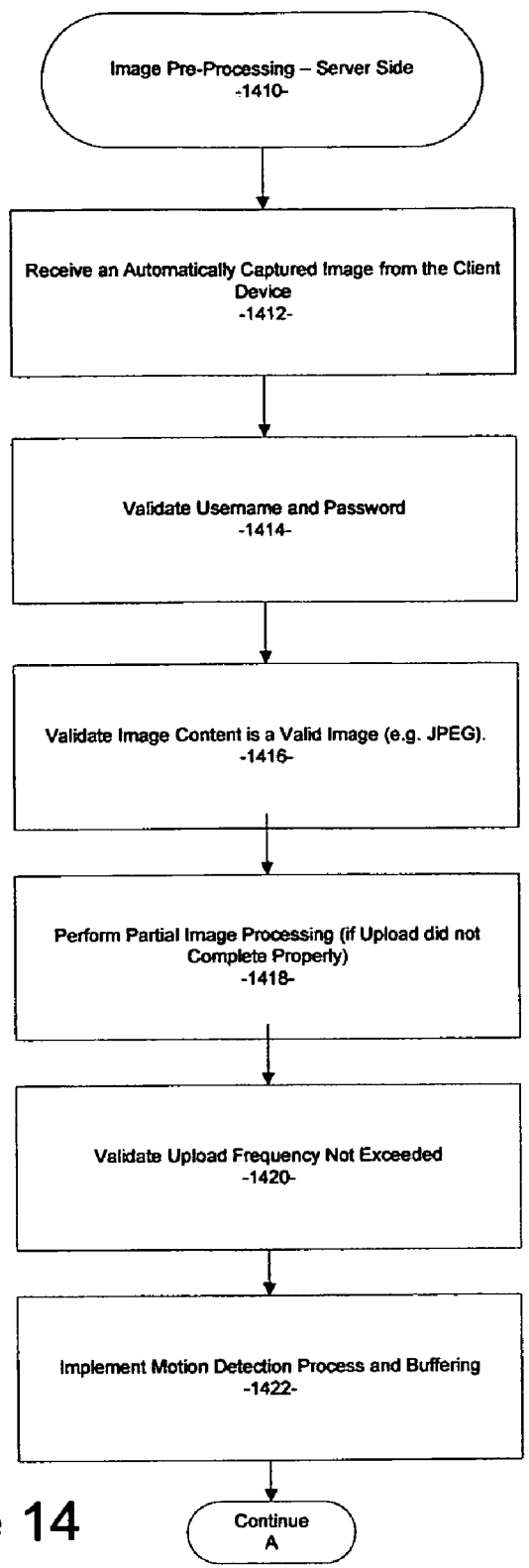
FIGS. 14-15 are flow diagrams illustrating image pre-processing.

Referring to FIG. 14, image preprocessing performed by the server upon receiving automatically captured images from a client device is illustrated. In block 1412, the server receives an automatically captured image from a client device. The image data packet sent by the client device includes user identification information and various image parameters. In block 1414, the server uses this information to validate the username and password of the user originating the image. In block 1416, the server validates that the image content is a valid image (e.g. the data/file is a JPEG formatted, or other image type formatted file). In block 1418, partial image processing is performed if the received image is incomplete or contains errant data. In block 1420, the server checks to determine if too many images from the particular client device have already been received. In other words, the server validates that the upload frequency for the client device has not been exceeded. In block 1422, a motion detection process and buffering process is applied to the received image. Using conventional techniques, a received image can be compared with previously received images to determine similarity of content. For example, if a camera position has not changed and the scene within the viewfinder of the camera has not changed, one would expect that two images captured by that camera would be exactly the same. In this case, one or more of the same captured images could be discarded to save storage space in server memory. Similarly, portions of captured images that have not changed from one captured image to the next can also be processed to optimize image storage space and processing time. Further, the changes between one captured image and the next can be used to signal motion detection in the captured images. The detection of motion in captured images can trigger other functionality of various embodiments. In one embodiment, the user can configure the level of motion detection sensitivity, and the amount of time before and after motion is detected that should be "buffered" for the purposes of giving a context to the saved images. The preprocessing operations performed by the server continue at the bubble A shown in FIG. 15.

Figure 15:
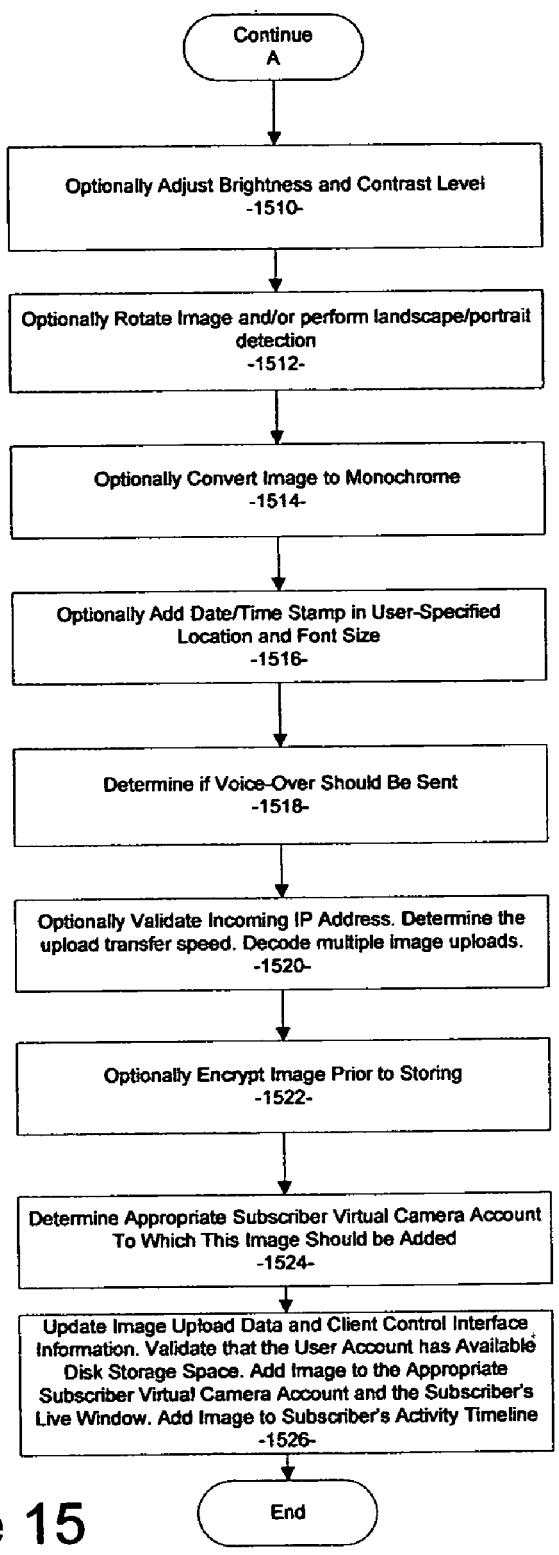

Referring to FIG. 15, the preprocessing operations performed by the server on an uploaded image continue at block 1510. In block 1510, the server uses the previously specified user preferences and configuration parameters to adjust the brightness and contrast level of the image (1510), optionally rotate the image (1512), optionally convert the image to monochrome (1514), optionally add a date/time stamp to the image in a user specified location and font size (1516), and to further adjust the uploaded image content. In addition, the server also automatically determines if the incoming image is configured in a landscape or portrait orientation. The client control interface (described below) is configured for the detected orientation. In block 1518, the server determines if a voiceover interaction request should be sent to the subscriber (i.e. the originator of the uploaded image) to establish a communication link between the subscriber and a guest viewing the subscriber's image collection. The voiceover functionality of the present invention is described in more detail below in connection with FIG. 21.

Referring still to FIG. 15, at processing block 1520, the server optionally validates the IP address of the incoming captured image. In one embodiment, the server can dynamically determine who the mobile operator is for the uploaded image. Because the mobile operator identity cannot be reliably determined from the data sent from the mobile device (e.g. the identity can be faked, or the content is not presented in a standard way), a new way must be used to determine the mobile operator identity. In one embodiment, the following processing steps are used:
1. Check to see the last time the operator was checked. If the time has not been within the required time, then invoke the algorithm to detect the operator. This is done so that a time-intensive operation is not done for each upload.
2. Get the source IP address.
3. Do a "whois" lookup on the IP address. If the returned data contains an "org name, orgname, organization name" then use that value. If an organization name does not appear, then use the first line returned.

In this manner, the server can validate the source of the captured image. Also at processing block 1520, the server determines the upload transfer speed. For devices/networks that are not "buffered", mark the start and end time of the upload and then calculate the bit rate based on the number of bits transferred over the measured time. For networks or devices that are "buffered", the mobile device must maintain processing statistics and upload statistics for a prior transfer on the subsequent transfer. These statistics are then transferred to the server. In one embodiment, the upload transfer speed determination process used can be based on the type of client device and/or network over which the upload is taking place. The upload transfer speed can also be used for pricing the automatic image upload service of the present invention. For example, faster upload speeds can be priced at higher values than slower upload speeds. Also at processing block 1520, the server can decode an upload request that contains multiple images. For example, some client devices have multiple cameras (e.g.—front/back). Other devices are "gateway" devices that gateway (i.e. aggregate) requests for multiple single-camera devices. In these cases, the server must process these multiple image uploads and decode the upload into single images. In block 1522, the server can optionally encrypt the received image prior to storing the image in server memory. Many conventional techniques are known for encrypting images. In block 1524, the server determines the appropriate subscriber virtual camera account to which the received image should be added. In the virtual camera feature of the present invention has broad ramifications. The purpose of the virtual camera feature is to allow the subscriber to associate a particular subscriber account as the target of the current upload session. Subscribers in the present invention can have multiple accounts, each with different guest lists and account properties. Each time a subscriber begins a session of capturing and uploading images from his/her camera-enabled mobile device, the subscriber can direct the images to a particular subscriber sub-account. This means that a single camera-enabled mobile device can be used to capture images for a different group of guests, by specifying the subscriber sub-account as a target account for the captured images associated for the desired group of guests. The virtual camera feature of the present invention provides the ability to dynamically change the destination account for uploaded images. In this manner, the present invention supports both professional and personal use and offers flexible privacy features.

Referring still to block 1526 shown in FIG. 15, the server adds a newly captured image, to the subscriber's live window and the appropriate virtual camera account. Prior to storing the captured image in the user account, the user account disk storage quota is checked. The image is not stored if the user account disk storage quota is exceeded. The server also retains the incoming image frequency so the server can configure the client browser to re-request the image upload at the appropriate rate. As will be described in more detail below, the subscriber and his/her guests can use a user interface provided by the present invention for monitoring, controlling, and viewing the capture and upload of subscriber images. The subscriber's live window is one portion of this user interface. Another portion of this user interface is the activity timeline. The activity timeline defines a time over which images are periodically captured. As an image is captured and retained by the server, and the event is recorded on the activity timeline in block 1526.

Figure 16:
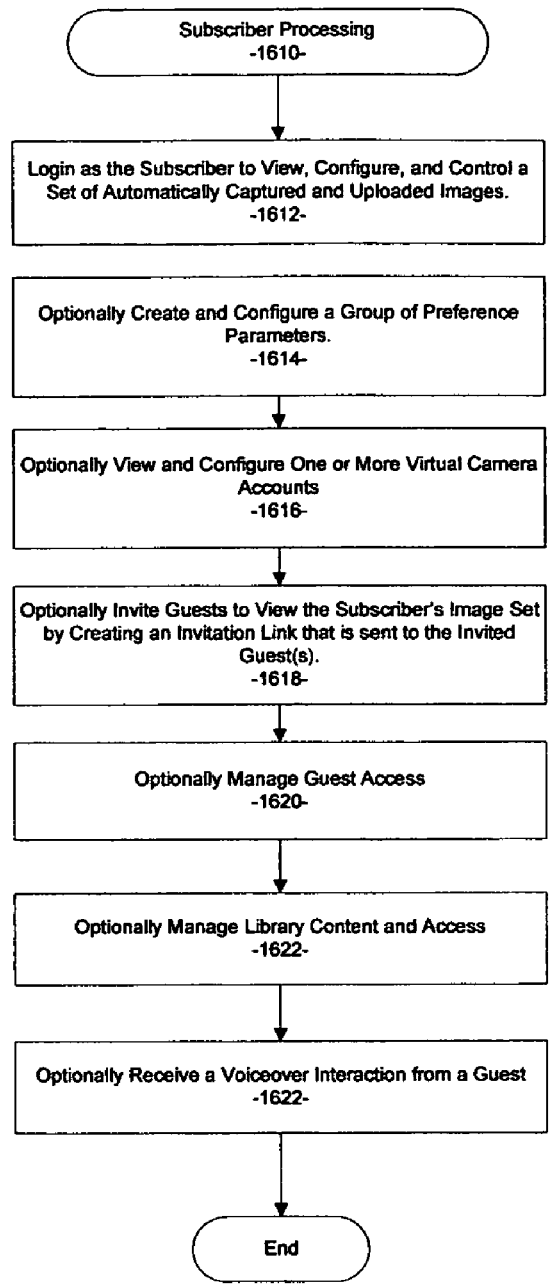
FIG. 16 is a flow diagram illustrating subscriber processing.

Referring to FIG. 16, basic subscriber processing steps are illustrated. In block 1612, the user can log in as a subscriber to view, configure, and control a set of automatically captured and uploaded images. In block 1614, the subscriber can optionally create and configure a group of preference parameters as described above. In block 1616, the subscriber can optionally view and configure one or more virtual camera accounts (i.e. subscriber sub-accounts) as described above. In block 1618, the subscriber may optionally invite guests to view the subscriber's image collection by creating an invitation link that is sent to the invite guest(s). An invitation link can be, for example, a hyperlink embedded in an e-mail that is sent to the invited guests. Invited guest processing is described in more detail in connection with FIG. 17. In block 1620, the subscriber can optionally manage guest access to his/her image collection. In block 1622, the subscriber can optionally manage the subscriber's library content and access thereto. Subscriber library access management processing is described in more detail below in connection with FIG. 19. In block 1622, a subscriber may optionally receive a voiceover interaction request from a guest. The voiceover function of the present invention allows invited guests to interact with a subscriber, while the image capture and upload process is active. In one embodiment, the guest is allowed to activate a voiceover soft button as part of the guest's user interface. Upon activation of the voiceover button; the guest is allowed to record a brief, audible message or to use a text to speech engine to convert text to a computer-generated voice. The recorded audible message from the guest is then delivered to the subscriber upon the next image upload from the subscriber. Upon receiving the voiceover message from the guest (block 1622), the subscriber may play the message through the speaker of their client device. In one embodiment, and the voiceover audible message from the guest may have prepended to it an audio advertisement for the subscriber.

Figure 17:
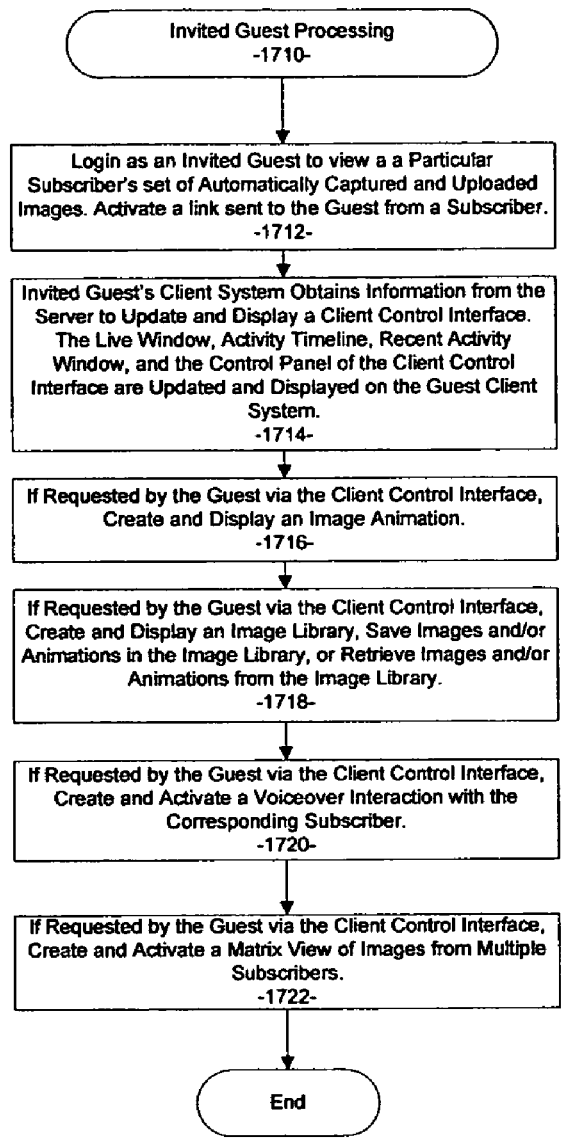
FIG. 17 is a flow diagram illustrating invited guest processing.

Referring to FIG. 17, invited guest processing is illustrated. As described herein, guests are users who wish to view a collection of images captured by a particular subscriber. In block 1712, a user can log in as an invited guest to obtain access to a particular subscriber's set of automatically captured and uploaded images. In one embodiment, a subscriber can give access to a guest by e-mailing to the guest an e-mail containing a link or a digital access key that the guest may use or activate to obtain authorization to access the subscriber's image collection. Once authorized, the invited guest may access a user interface of the present invention, denoted the client control interface, with which the invited guest may view and manage access to the subscriber's image collection. As part of the client control interface, the server updates and displays a live window, and activity timeline, a recent activity window, and a control panel with which the invited guest may manage access to the subscriber's image collection (block 1714). Using the client control interface, the invited guests can view the subscriber's captured images. The activity timeline can be used to define which images the guest would like to view. Further, the guest can use the client control interface to command the creation and display of an image animation (block 1716). Image animation processing is described in more detail below in connection with FIG. 20. In block 1718, the invited guests can also use the client control interface to access a subscriber's image library. The invited guest may select a subscriber's image library, save images and/or animations in the image library, or retrieve images and/or animations from the subscriber's image library. The subscriber's library management functionality is described in more detail below in connection with FIG. 19. In block 1720, the invited guests can create and activate a voiceover interaction with the corresponding subscriber as described above. In block 1722, the invited guest can use the client control interface to create and activate a matrix view of images from multiple subscribers (see FIG. 24). The matrix view allows a guest to see multiple live automatic image broadcasts from multiple subscribers in one browser screen. All images from each of the corresponding subscribers automatically update at the predefined frequency as specified by the particular subscriber.

Figure 18:
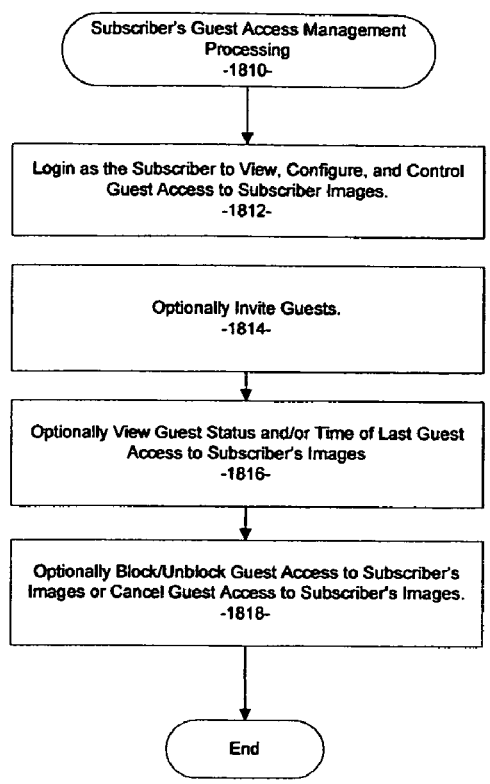
FIG. 18 is a flow diagram illustrating processing for subscriber guest access management.

Referring to FIG. 18, the subscriber's guest access management processing is illustrated. In block 1812, a user can log in as the subscriber to view, configure, and control guest access to that subscriber's images. The subscriber can use the client control interface to manage guest access. In block 1814, the subscriber can optionally invite guests as described above. In one embodiment, a subscriber may send an e-mail with an invitation link to a guest and request the guest to activate the link. The subscriber may also optionally view guest status and or view the time of the last guest access to the subscriber's images (1816). The subscriber may also optionally block or unblock guest access to the subscriber's images or cancel guest access to the subscriber's images (block 1818).

Figure 19:
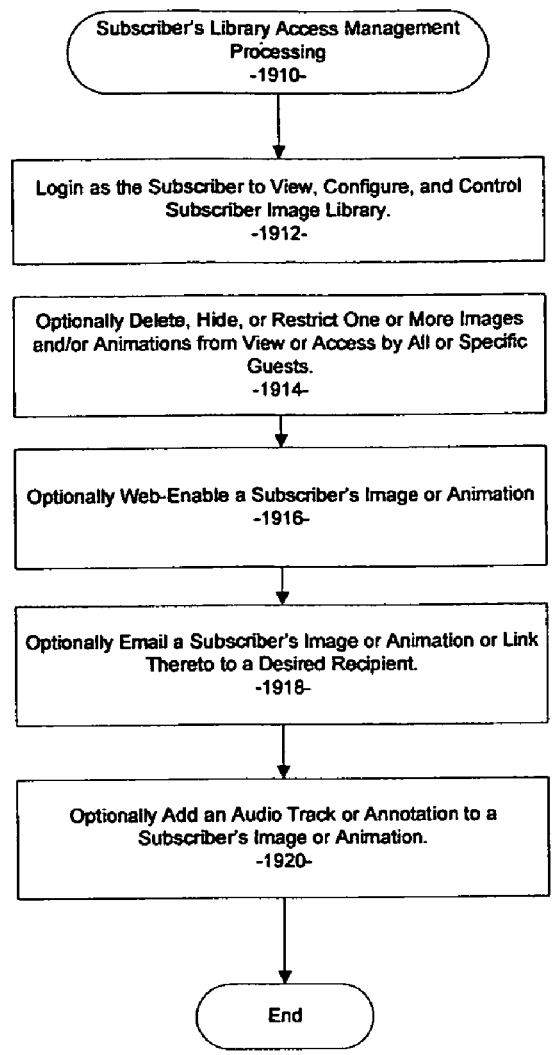
FIG. 19 is a flow diagram illustrating processing for subscriber library access management.

Referring to FIG. 19, the subscriber's library access management processing is illustrated. In block 1912, a user can log in as the subscriber to view, configure, and control the subscriber's image library. The subscriber can use the client control interface for this purpose. Each subscriber has their own library, where images and animations can be saved and shared. Guests can save animations to the subscriber's library as well as e-mail existing clips from the library. In block 1914, the subscriber can optionally delete, hide, or restrict one or more images and/or animations from view or access by all or particular guests. In block 1916, the subscriber can optionally web-enable a subscriber's image or animation. Web-enabling an image or animation means that a (Uniform Reference Locator) URL is created that allows anyone on the Internet to view the image or animation upon accessing the URL. This feature is useful for integrating an image or an animation clip into a user's blog or web site. In block 1918, the subscriber may optionally e-mail an image or animation or a link thereto to a desired recipient. In block 1920, the subscriber may add an audio track, an annotation, or a caption to an image or animation in the subscriber's library.

Figure 20:
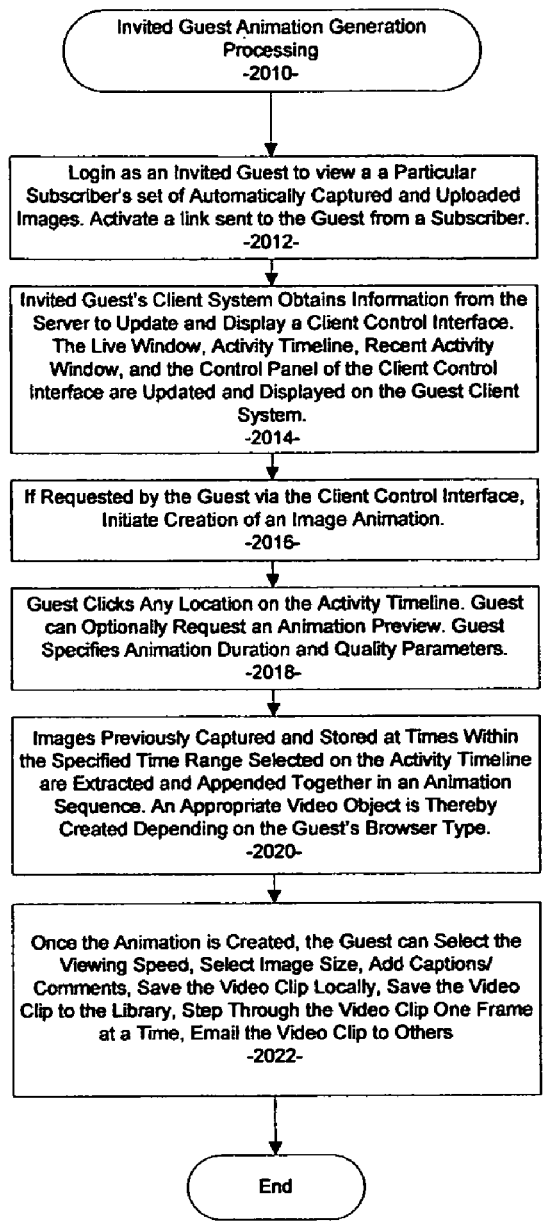
FIG. 20 is a flow diagram illustrating processing for invited guest animation generation.

Referring to FIG. 20, invited guest animation generation processing is illustrated. In block 2012, a user logs in as an invited guest to view a particular subscriber's collection (i.e. library) of automatically captured and uploaded images. As described above, the invited guest can obtain authorization to view a subscriber's library by activating a link sent to the guest from the subscriber. Once authorized, the invited guest may access the client control interface, with which the invited guest may view and manage access to the subscriber's image collection. As part of the client control interface, the server updates and displays a live window, an activity timeline, a recent activity window, and a control panel with which the invited guest may manage access to the subscriber's image collection (block 2014). Using the client control interface, the invited guests can view the subscriber's captured images. The activity timeline can be used to define which images the guest would like to view. The activity timeline can also be used to "preview" captured images. This option allows a single image to be shown from the timeline where the user clicks. In one embodiment, the previewed image is shown as a thumbnail image captured at a time corresponding to the time selected by the user on the timeline. Also, in a "delete" mode, the subscriber can click on a particular location on the timeline and associated images will be deleted. Further, the guest can use the client control interface to command the creation and display of an image animation (block 2016). To create an animation, the guest clicks any location on the activity timeline displayed as part of the client control interface. In one embodiment, the activity timeline is the primary way for a user to signal the conversion of images into video objects. The activity timeline is a visual representation of the subscriber's upload activity on a daily basis graphed over a 24-hour clock in a time zone local to the subscriber. This view can be assigned to any calendar day for which image archives exist for the subscriber. Once the user clicks any location on the activity timeline, an animation is created with the selected duration and quality (block 2018). As described above, images in the subscriber's library corresponding to the time selected on the activity timeline by the guest are combined to form an animation clip or video object (block 2020). The appropriate video object is created based on the browser type (for example, QuickTime for Mozilla and AVI for Windows Internet Explorer). The guest user can select the duration (anywhere from one minute to 12 hours) and the quality level (so as to avoid large file downloads, unless specifically desired). Once the animation is created, the guest can select the viewing speed, save the video clip to the library, step through the clip one frame at a time, or e-mail of video clip to others (block 2022).

Figure 21:
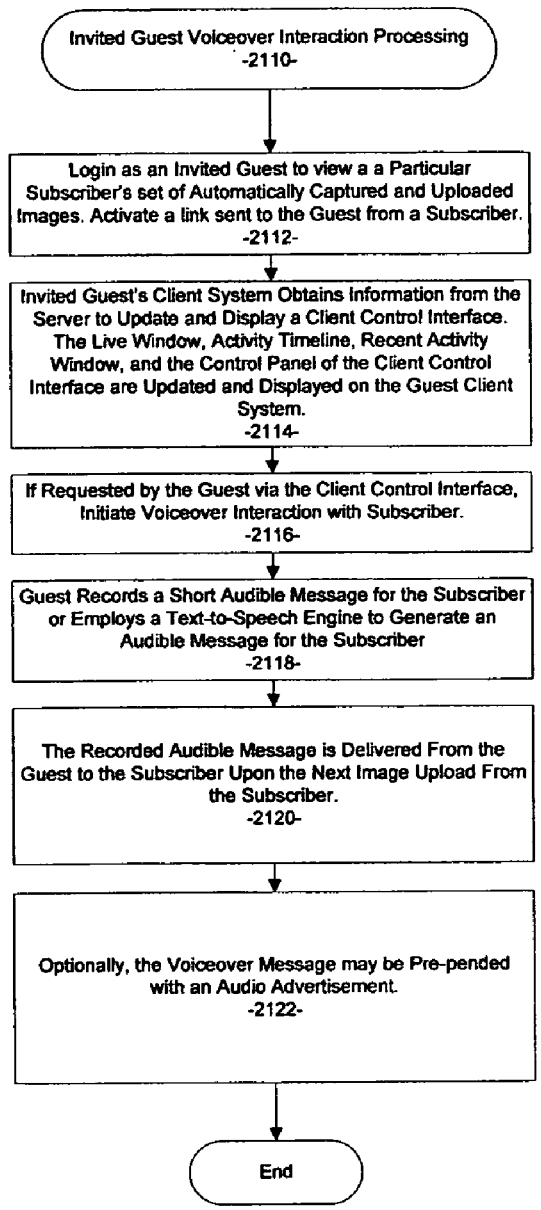
FIG. 21 is a flow diagram illustrating processing for invited guest voiceover interaction.
Figure 22:
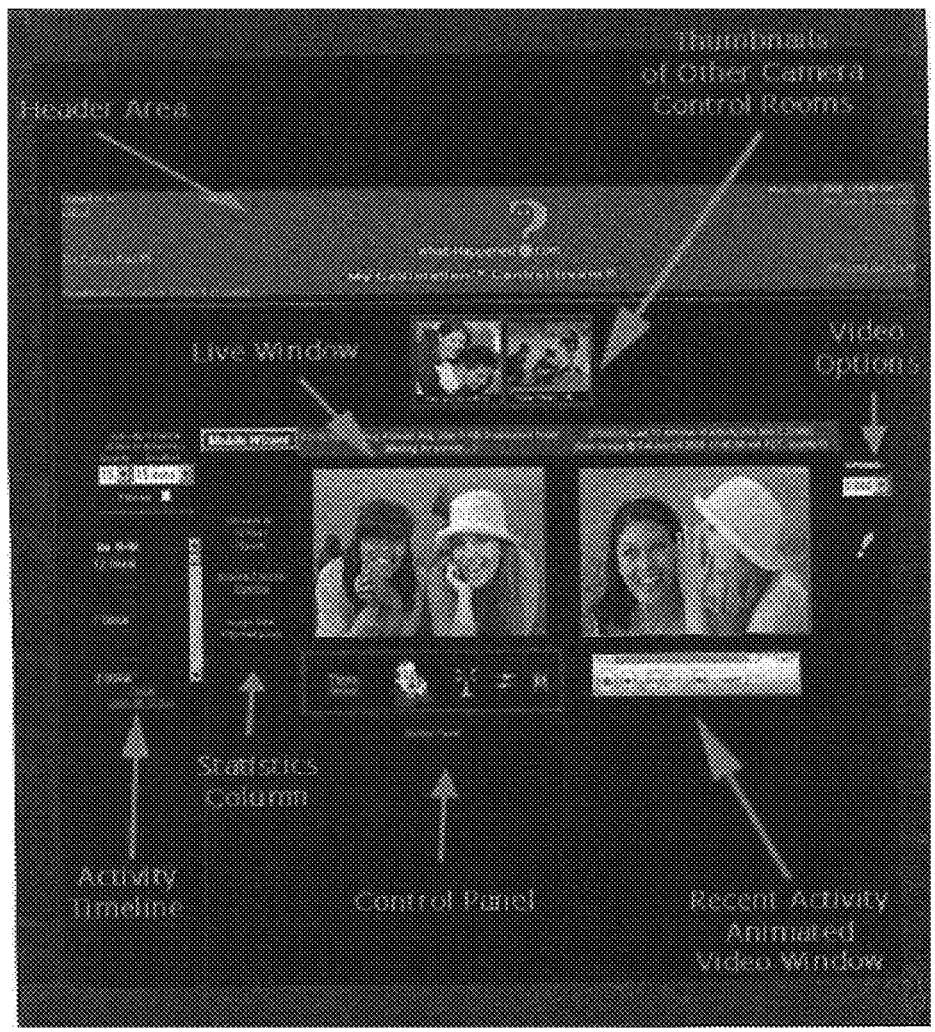
FIGS. 22-24 illustrate various embodiments of the client control user interface.
Figure 23:
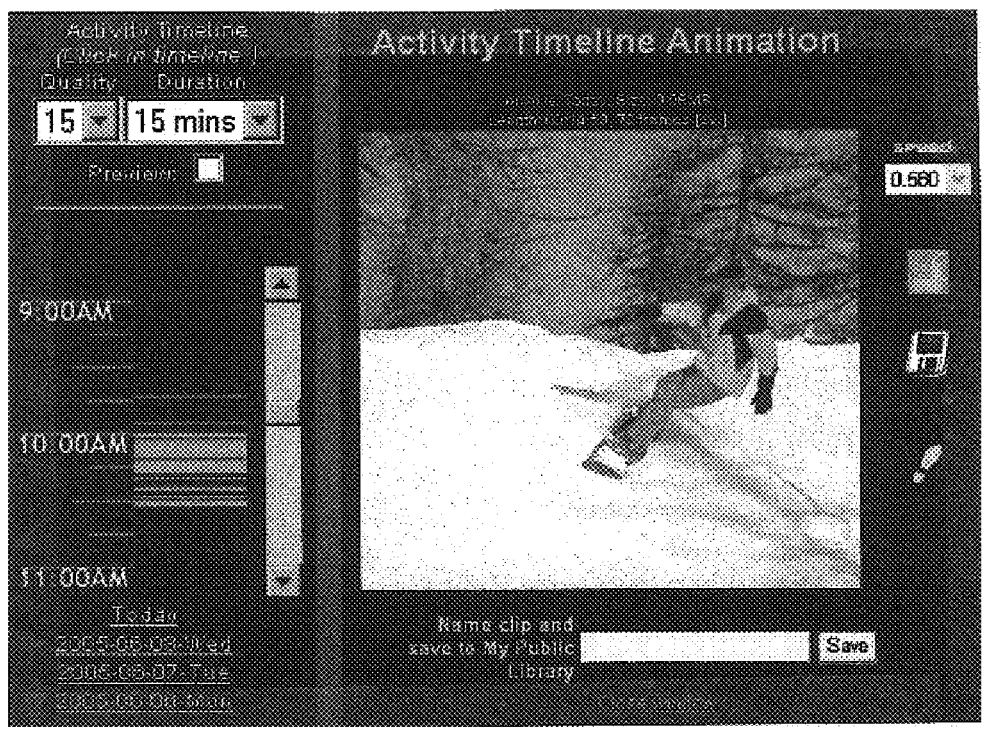
Figure 24:
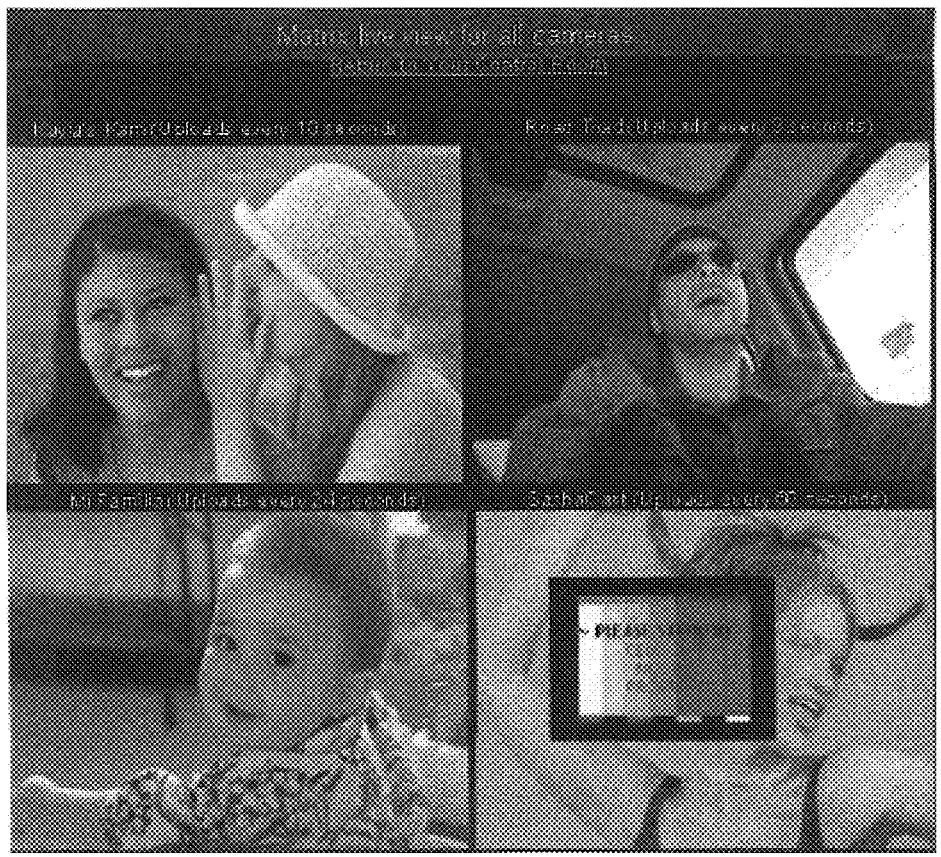

Referring to FIG. 21, invited guest voiceover interaction processing is illustrated. In block 2112, a user logs in as an invited guest to view a particular subscriber's collection (i.e. library) of automatically captured and uploaded images. As described above, the invited guest can obtain authorization to view a subscriber's library by activating a link sent to the guest from the subscriber. Once authorized, the invited guest may access the client control interface, with which the invited guest may view and manage access to the subscriber's image collection. As part of the client control interface, the server updates and displays a live window, and activity timeline, a recent activity window, and a control panel with which the invited guest may manage access to the subscriber's image collection (block 2114). Using the client control interface, the invited guests can view the subscriber's captured images. Further, the guest can use the client control interface to command the initiation of a voiceover interaction with the subscriber (block 2116). As part of the voiceover feature, the guest records a short audible message for the subscriber or employs a text to speech engine to generate an audible message for the subscriber (block 2118). The recorded audible message is delivered from the guest to the subscriber upon the next image upload from the subscriber (block 2120). In an alternative embodiment, the voiceover can be originated as a text message and converted to an audible message via conventional text-to-speech processing. Optionally, the voiceover message may be pre-pended or post-pended with an audio or textual advertisement, notice, or the like. Referring to FIG. 22, one embodiment of the client control user interface is illustrated. As shown, the client control user interface includes a live window in which the newly uploaded images are displayed. Incoming uploaded images replace the current image displayed in the live window as the new image is received. If no new image is received within a predetermined time period, the current image in the live window is replaced with a test pattern or a message that advises the user that a new uploaded image is not available. FIG. 22 also shows the recent activity window in which an animation of the last N minutes of uploaded images is displayed. FIG. 22 also illustrates the activity timeline with which a user can preview, delete, or select images for animation as described above. A more detailed view of the activity timeline is shown in FIG. 23. Note that the shaded areas to the right of the time scale indicate time periods in which images were uploaded. Referring again to FIG. 22, the client control user interface of one embodiment also includes a statistics column in which system metrics (e.g. upload speeds, etc.) are displayed. The client control user interface also provides a control panel with which the user can select a voiceover function as described above. FIG. 22 also shows a display of thumbnail images from other camera sources. An alternative matrix display is shown in FIG. 24 in which images from multiple sources can be displayed. FIG. 22 also provides control interfaces with which the user can specify video options for the image animations. A header area also provides useful information for the user. It will be apparent to those of ordinary skill in the art that many alternative equivalent implementations of the client control interface are possible. Such implementations are still within the scope of the claims that follow.

The structure and operation of the present invention device is described herein. Applications for the described and claimed invention are numerous and varied, with a subset described here. The two main categories can be broken into commercial and consumer.

Commercial applications include security/monitoring, and data generation for operations research. Security and monitoring using a mobile camera-enabled mobile device allows flexibility in placement of the device (vs. attaching a fixed camera) and allows the use of ubiquitous, low-cost wireless (e.g. Cell phone) networks. Hence, environments that are not typical factory or office facilities can be monitored as long as there is a power source and cell phone reception. Operations research can be dramatically enhanced by placing camera-enabled mobile devices, coupled with this invention, into a fleet of vehicles or trucks of a business. A delivery company can remotely monitor all the activity of a vehicle, and archive/animation the activity by using low-cost cell phone technology (coupled with the present invention).

Consumer applications are primarily for entertainment and near real-time sharing of activity, bring people closer and enabling them to be "content creators." Distant relatives can watch a remote family event (birthday, wedding, etc.) through the use of this invention (which otherwise could not be possible). As well, consumer applications can use the security/monitoring aspect. A parent could place the mobile device near an infant in a crib or near a pool in their backyard, and monitor the activity in their office with their computer (or on their mobile device as well). Without the invention, these scenarios would be much less convenient (much less ad hoc) and much, much more expensive to create.

Thus, a computer-implemented system and method for automatically capturing images with a camera-enabled mobile device and for uploading the images to a network server is disclosed. While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

I claim:
1. A method comprising:
    automatically capturing a plurality of images in a camera-enabled mobile device without user action for each image capture, the automatic capture of the plurality of images being performed under control of a program downloaded by a user via a public network to the camera-enabled mobile device, the automatic capture of each image of the plurality of images being performed periodically according to a pre-configured parameter;
    configuring an HTTP or TCP data block with information related to the automatically captured plurality of images;
    automatically uploading the plurality of images with the HTTP or TCP data block to a network server without user action for each image upload, the automatic upload of the plurality of images being performed under control of the program downloaded by the user via the public network to the camera-enabled mobile device; and
    upon completion of the automatic uploading of the plurality of images, enabling automatic capture of a next plurality of images in the camera-enabled mobile device without user action.
2. The method as claimed in claim 1 further including creating an animation of two or more images of the plurality of images.
3. The method as claimed in claim 1 further including retaining the plurality of images in a server, and making the plurality of images accessible to authorized guests.
4. The method as claimed in claim 1 further including a client control interface to view the plurality of images and a set of related animations.
5. The method as claimed in claim 1 wherein the plurality of images is uploaded wirelessly.
6. The method as claimed in claim 1 wherein a frequency of image capture is user selectable.
7. The method as claimed in claim 2 further including inserting an ancillary image into the animation.
8. The method as claimed in claim 7 wherein the ancillary image is an advertisement.
9. The method as claimed in claim 2 wherein an image of the plurality of images from which the animation is created is selected by a user on an activity timeline.
10. The method as claimed in claim 1 further including retaining the plurality of images in a user library.
11. The method as claimed in claim 1 further including creating a voiceover interaction with a subscriber.
12. The method as claimed in claim 11 wherein the voiceover interaction is a recorded audio message.
13. The method as claimed in claim 11 wherein the voiceover interaction is a text message.
14. The method as claimed in claim 1 further including adding a caption to at least one of the plurality of images.
15. The method as claimed in claim 1 further including creating a virtual camera user account and retaining images in a virtual camera user account.
16. A server apparatus, comprising:
    an interface to receive an unload of a plurality of automatically captured images from a camera-enabled mobile device, the plurality of automatically captured images having been captured without user action for each image capture, the automatic capture of the plurality of images and the upload of the plurality of automatically captured images being performed under control of a program downloaded by a user via a public network to the camera-enabled mobile device, the automatic capture of each image of the plurality of images being performed periodically according to a pre-configured parameter, the plurality of automatically captured images being received with an HTTP or TCP data block configured with information related to the plurality of automatically captured images; and a pre-processing component to process the plurality of images for storage in the server and for access by authorized guests via a network, the pre-processing component further to send a reply message with an HTTP or TCP data block to indicate readiness to receive a next upload of a plurality of automatically captured images from the camera-enabled mobile device.

17. The server apparatus as claimed in claim 16 further including an animation component to create an animation of two or more images of the plurality of images.

18. The server apparatus as claimed in claim 17 further including a client control interface to view the plurality of images and a set of related animations.

19. The server apparatus as claimed in claim 16 wherein the plurality of images is received via a wireless network transfer.

20. The server apparatus as claimed in claim 17 further including an ancillary image processing component to insert an ancillary image into the animation.

21. The server apparatus as claimed in claim 16 further including a library component to retain the plurality of images in a user library.

22. The server apparatus as claimed in claim 16 further including a voiceover component to create a voiceover interaction between a subscriber and a guest.

23. The server apparatus as claimed in claim 16 further including a user account component to create and manage a virtual camera user account and to retain images in a virtual camera user account.

24. A client apparatus, comprising:

a camera-enabled mobile device;

an automatic capture component to automatically capture a plurality of images with the camera-enabled mobile device at a user specified rate, the plurality of automatically captured images being captured without user action for each image capture, the automatic capture of the plurality of images being performed under control of a program downloaded by a user via a public network to the camera-enabled mobile device, the automatic capture of each image of the plurality of images being performed periodically according to a pre-configured parameter, the automatic capture component further to configure an HTTP or TCP data block with information related to the automatically captured plurality of images; and an automatic upload component to automatically upload the plurality of images with the HTTP or TCP data block to a network server without user action for each image upload, the automatic upload of the plurality of images being performed under control of the program downloaded by the user via the public network to the camera-enabled mobile device, upon completion of the automatic upload of the plurality of images, enable automatic capture of a next plurality of images in the camera-enabled mobile device without user action.

25. The client apparatus as claimed in claim 24 further including a client control interface to view the plurality of images and a set of related animations.

26. The client apparatus as claimed in claim 24 wherein the plurality of images is uploaded wirelessly.

27. The client apparatus as claimed in claim 24 further including a voiceover component to create a voiceover interaction with a subscriber.

28. The client apparatus as claimed in claim 27 wherein the voiceover interaction is a recorded audio message.

29. The client apparatus as claimed in claim 25 wherein the client control interface further includes a recent activity window in which an animation of the last N minutes of uploaded images is displayed.

* * * * *

UNITED STATES PATENT AND TRADEMARK OFFICE
CERTIFICATE OF CORRECTION

PATENT NO. : 7,639,943 B1  Page 1 of 1
APPLICATION NO. : 11/281193
DATED : December 29, 2009
INVENTOR(S) : Kevin E. Kalajan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 507 days.

Signed and Sealed this

Ninth Day of November, 2010

David J. Kappos
*Director of the United States Patent and Trademark Office*